US009208175B2

(12) United States Patent
Shaw et al.

(10) Patent No.: US 9,208,175 B2
(45) Date of Patent: *Dec. 8, 2015

(54) DEFINING AND MATCHING SEGMENTS

(75) Inventors: Mark Shaw, San Francisco, CA (US); Davis Kitchel, Norwich, VT (US)

(73) Assignee: Strava, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,799

(22) Filed: Apr. 5, 2012

(65) Prior Publication Data

US 2012/0254212 A1    Oct. 4, 2012

Related U.S. Application Data

(63) Continuation of application No. 13/077,410, filed on Mar. 31, 2011.

(51) Int. Cl.
*G06F 7/00* (2006.01)
*G06F 17/30* (2006.01)

(52) U.S. Cl.
CPC .... *G06F 17/30271* (2013.01); *G06F 17/30241* (2013.01)

(58) Field of Classification Search
CPC .............. G04G 17/04; G06F 17/30041; G06F 17/30595; G06F 17/30241; G06Q 10/06; G06Q 10/0639; G01S 19/19; A63G 7/00
USPC .................. 707/918, E17.014, 758, 687, 769; 701/32.4, 412; 700/91; 715/716
See application file for complete search history.

(56) References Cited

U.S. PATENT DOCUMENTS

| | | | |
|---|---|---|---|
| 5,552,990 A | 9/1996 | Ihara et al. | |
| 6,366,927 B1 | 4/2002 | Meek et al. | |
| 6,453,235 B1 | 9/2002 | Endo et al. | |
| 7,080,065 B1 * | 7/2006 | Kothuri et al. | 1/1 |
| 7,662,064 B2 | 2/2010 | Lee et al. | |

(Continued)

FOREIGN PATENT DOCUMENTS

WO        2008105651         9/2008

OTHER PUBLICATIONS

Author Unknown, RouteBoxer Documentation: Examples, downloaded from http://google-maps-utility-library-v3.googlecode.com/svn/trunk/routeboxer/docs/examples.html, document date Mar. 7, 2011 (Example 1).

(Continued)

*Primary Examiner* — Taelor Kim
*Assistant Examiner* — Berhanu Mitiku
(74) *Attorney, Agent, or Firm* — Van Pelt, Yi & James LLP

(57) ABSTRACT

Defining and matching segments is disclosed. In some embodiments, defining and matching segments includes receiving a user defined segment via a user interface input; and determining a matching effort (e.g., which can include a set of Geographic Positioning System (GPS) data) to the segment using a processor. In some embodiments, the data associated with the effort includes one or more of the following: heart rate, speed, time, and power. In some embodiments, defining and matching segments further includes storing data associated with the matching effort with the segment. In some embodiments, the user defined segment is based at least in part in uploaded GPS data. In some embodiments, the user defined segment is based at least in part on selected points on a map application.

19 Claims, 17 Drawing Sheets

(56) References Cited

U.S. PATENT DOCUMENTS

| | | | |
|---|---|---|---|
| 7,756,639 | B2 | 7/2010 | Colley et al. |
| 7,828,697 | B1 | 11/2010 | Oberrieder et al. |
| 7,901,292 | B1 | 3/2011 | Uhlir et al. |
| 7,931,562 | B2 | 4/2011 | Ellis et al. |
| 7,953,549 | B2 | 5/2011 | Graham et al. |
| 8,108,139 | B1 | 1/2012 | Pylant |
| 8,112,251 | B2* | 2/2012 | Case et al. ............ 702/182 |
| 8,121,785 | B2 | 2/2012 | Swisher et al. |
| 8,271,497 | B2 | 9/2012 | Ikenoue |
| 8,326,532 | B2 | 12/2012 | Kmiecik et al. |
| 2001/0027373 | A1 | 10/2001 | Bates et al. |
| 2005/0033515 | A1 | 2/2005 | Bozzone |
| 2005/0137871 | A1 | 6/2005 | Capman et al. |
| 2005/0288154 | A1 | 12/2005 | Lee et al. |
| 2007/0208469 | A1 | 9/2007 | Wille et al. |
| 2007/0288157 | A1 | 12/2007 | Peterman |
| 2008/0033633 | A1 | 2/2008 | Akiyoshi et al. |
| 2008/0082254 | A1 | 4/2008 | Huhtala et al. |
| 2008/0096726 | A1 | 4/2008 | Riley et al. |
| 2008/0262717 | A1 | 10/2008 | Ettinger |
| 2008/0262721 | A1 | 10/2008 | Guo et al. |
| 2009/0043495 | A1 | 2/2009 | Hattori et al. |
| 2009/0070035 | A1 | 3/2009 | Van Buer |
| 2009/0088962 | A1* | 4/2009 | Jones ............ 701/200 |
| 2009/0204597 | A1 | 8/2009 | Mani et al. |
| 2009/0326809 | A1 | 12/2009 | Colley et al. |
| 2010/0042427 | A1 | 2/2010 | Graham et al. |
| 2010/0062817 | A1 | 3/2010 | Seydoux |
| 2010/0062905 | A1 | 3/2010 | Rottler et al. |
| 2010/0088023 | A1 | 4/2010 | Werner |
| 2010/0099437 | A1 | 4/2010 | Moerdijk et al. |
| 2010/0131184 | A1 | 5/2010 | Stanton |
| 2010/0185386 | A1 | 7/2010 | Hess |
| 2010/0210421 | A1 | 8/2010 | Case et al. |
| 2010/0279825 | A1 | 11/2010 | Riley et al. |
| 2011/0003665 | A1 | 1/2011 | Burton et al. |
| 2011/0032105 | A1* | 2/2011 | Hoffman et al. ............ 340/573.1 |
| 2011/0137546 | A1 | 6/2011 | Roesser et al. |
| 2011/0208429 | A1 | 8/2011 | Zheng et al. |
| 2011/0243431 | A1 | 10/2011 | Sangappa et al. |
| 2011/0289031 | A1 | 11/2011 | Zheng et al. |
| 2011/0307165 | A1 | 12/2011 | Hiestermann et al. |
| 2012/0004845 | A1 | 1/2012 | Kmiecik et al. |
| 2012/0028761 | A1 | 2/2012 | Dorogusker et al. |
| 2012/0095578 | A1* | 4/2012 | Tchao et al. ............ 700/91 |
| 2012/0158668 | A1* | 6/2012 | Tu et al. ............ 707/687 |
| 2012/0209518 | A1 | 8/2012 | Nowak et al. |
| 2012/0265432 | A1 | 10/2012 | Ashby |
| 2013/0006925 | A1 | 1/2013 | Sawai et al. |
| 2013/0031049 | A1 | 1/2013 | Watanabe et al. |
| 2013/0166049 | A1 | 6/2013 | Werner et al. |

OTHER PUBLICATIONS

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 2).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 3).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 4).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 5).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 6).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 7).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 8).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 9).

Author Unknown, RouteBoxer Documentation: Examples, downloaded from http://google-maps-utility-library-v3. googlecode.com/svn/trunk/routeboxer/docs/examples.html, document date Mar. 7, 2011, downloaded Aug. 2, 2011,(Example 10).

\* cited by examiner

| Effort ID | GPS Information | User ID | Date | Speed | Heart Rate | Power | Time |
|---|---|---|---|---|---|---|---|
| 1 | E1(P1, P2, P3...Px) | A | 1/29/2011 | 20.6 | 170 | 340 | 3:10 |
| 2 | E2(P1, P2, P3...Py) | B | 1/3/2011 | 24.7 | 184 | 330 | 2:56 |
| 3 | E3(P1, P2, P3...Pz) | C | 12/4/2010 | 18.2 | 165 | 320 | 1:02 |

FIG. 2B

| Segment ID | MBR | Fill Ratio |
| --- | --- | --- |
| Old_La_Honda | MBR1(x1, x2, y1, y2) | 6/26 |
| Old_La_Honda | MBR2(x1, x2, y1, y2) | 4/26 |
| Old_La_Honda | MBR3(x1, x2, y1, y2) | 10/26 |
| Old_La_Honda | MBR4(x1, x2, y1, y2) | 6/26 |
| ... | ... | ... |
| N | MBRn(x1, x2, y1, y2) | (Tiles in MBRn) / (Total Tiles for Segment N) |

Latest Rides

| Name | Date | MPH | HR | Watts | Time |
|---|---|---|---|---|---|
| User 1 | Sat, Mar 27, 2010 | 11.9 | - | 172 | 27:27 |
| User 2 | Sun, Mar 21, 2010 | 18.4 | 152 | 160 | 17:50 |
| User 3 | Sat, Mar 20, 2010 | 16.4 | 147 | 135 | 19:56 |
| User 4 | Sat, Mar 20, 2010 | 16.7 | 129 | 121 | 19:36 |
| User 5 | Fri, Mar 19, 2010 | 16.3 | - | 341(pm) | 20:05 |

Click here to see all the rides on this segment

⎫
⎬ 1402
⎭

Segment Leaders

| Rank | Name | Date | MPH | HR | Watts | Time |
|---|---|---|---|---|---|---|
| 1 | User 45 | Tue, May 06, 2008 | 24.3 | - | - | 13:27 |
| 2 | User 24 | Wed, Jul 15, 2009 | 22.2 | 169 | 254 | 14:43 |
| 3 | User 3 | Sat, Jun 20, 2009 | 22.0 | 138 | 228 | 14:54 |
| 4 | User 43 | Mon, Oct 19, 2009 | 21.4 | 168 | 203 | 15:16 |
| 5 | User 15 | Mon, Oct 19, 2009 | 21.2 | - | 249 | 15:27 |

Click here to see the full KOM leaderboard for this segment

⎫
⎬ 1404
⎭

Segment Leader History

| Rank | Name | Date | MPH | HR | Watts | Time |
|---|---|---|---|---|---|---|
| 1 | User 5 | Tue, May 06, 2008 | 24.3 | - | - | 13:27 |

DEFINING AND MATCHING SEGMENTS

CROSS REFERENCE TO OTHER APPLICATIONS

This application is a continuation of co-pending U.S. patent application Ser. No. 13/077,410, entitled DEFINING AND MATCHING SEGMENTS filed Mar. 31, 2011 which is incorporated herein by reference for all purposes.

BACKGROUND OF THE INVENTION

Conventionally, an athlete can use a device to record the Global Positioning System (GPS) locations and other metrics (e.g., time and heart rate) of a physical activity. For example, a device user can wear a GPS device on a run. The GPS device could then record and store the GPS coordinates and other information associated with the run.

However, typically, in order with for two or more athletes to compare their performance over the same geographical terrain, they would have to attempt to manually synchronize their activity. For example, two cyclists competing over the same course at the same time would need to rely on the other to start and stop their respective GPS devices at the same time. Also, for example, two cyclists competing over the same course at different times might need to estimate the exact the locations of the start and stop points of the other cyclist. Manually attempting to synchronize athletic performance can be inefficient and imprecise.

BRIEF DESCRIPTION OF THE DRAWINGS

Various embodiments of the invention are disclosed in the following detailed description and the accompanying drawings.

FIG. 2B is a diagram showing an example of efforts stored in a table at the efforts database in accordance with some embodiments.

FIG. 10B is a diagram showing an example of entries of a database table for storing segment information in accordance with some embodiments.

FIG. 14 is a diagram showing an example of a display of analyzed data for matched efforts in accordance with some embodiments.

DETAILED DESCRIPTION

Figure 1:
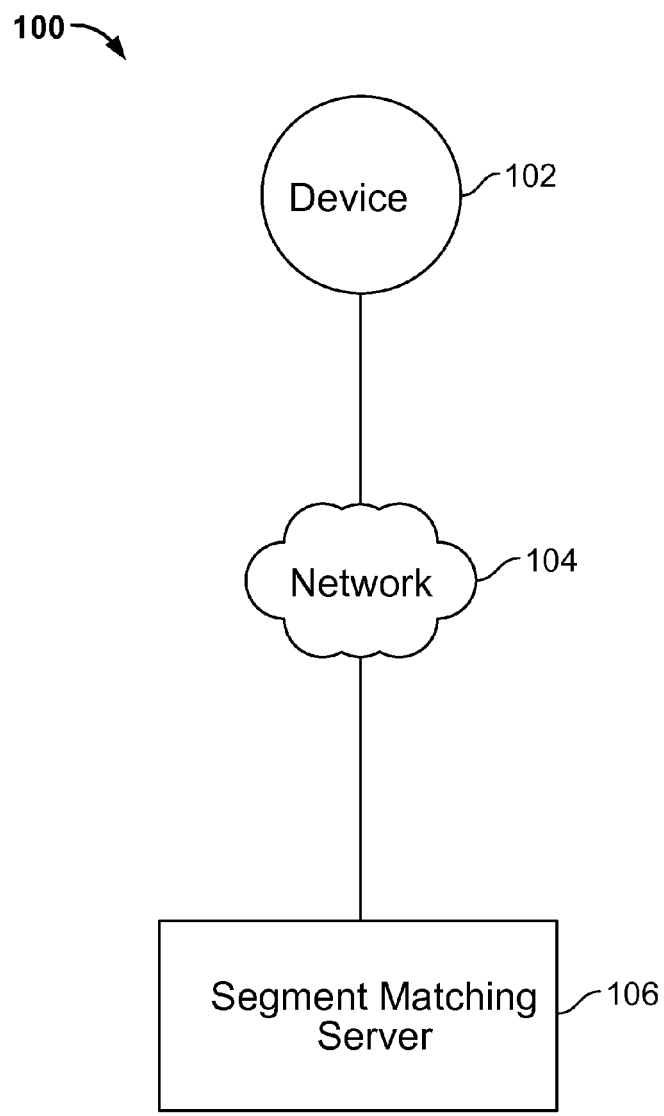
FIG. 1 is a system for defining and matching segments in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Defining segments and matching efforts to segments are disclosed herein. As used herein, a segment refers to a geographical track that is of interest and can be used as a reference (e.g., for comparison of athletic performance along that track and/or for other applications). For example, a segment can be used to identify a popular hill climb for cyclists. As used herein, an effort refers to a recorded series of GPS information with timestamps (e.g., which can represent an instance of athletic performance). In some embodiments, an effort is stored with associated data (e.g., metrics of the activity with which the effort is associated). In some embodiments, one or more segments are derived from a stored effort. In some embodiments, a user can define a segment. In some embodiments, a visual representation of an effort is presented at a user interface and a user defines a segment using the visual representation. In some embodiments, a map is presented at a user interface and a user defines a segment by indicating a track on the map. In various embodiments, a series of GPS information is converted into a set of geographical abstractions prior to storing it as a segment. In some embodiments, a segment is stored with the associated data of efforts that have been determined to match the segment.

In various embodiments, an effort is matched against stored segments. In various embodiments, two levels of matching can be performed using the effort and the stored segments. In the first level of matching, if a percentage of match of the effort to one of the stored segments exceeds a first threshold, then a first determination is made (e.g., the effort is a loose match to the segment). In the second level of matching, if a percentage of match of the effort to one of the stored segments exceeds a second threshold (that is greater than the first threshold), and in addition, the effort also crosses the start and finish line associated with the segment, then a second determination is made (e.g., the effort is a tight match to the segment). In some embodiments, it can be determined that an effort is a loose match to one or more stored segments and the effort is also a tight match to one or more stored segments. In some embodiments, if an effort matches (e.g., either as a loose or tight match) to a segment, the associated data of the effort is compared against the associated data stored with the matched segment. In some embodiments, if an effort matches to a segment, the associated data of the effort is also compared against the associated data of other efforts that match the segment.

FIG. 1 is a system for defining and matching segments in accordance with some embodiments. System 100 includes device 102, network 104, and segment matching server 106. Network 104 includes various high-speed data networks and/or telecommunications networks. Device 102 communicates to segment matching server 106 through network 104. In some embodiments, system 100 may include more or fewer components than what is shown in the example of FIG. 1.

Device 102 is a device that can record GPS information and/or other data associated with a physical activity. Device 102 can also be a device to which GPS information and/or other data associated with a physical activity can be uploaded or transferred. Examples of device 102 includes, but is not limited to: a GPS device (e.g., Garmin Forerunner and Edge devices, including Garmin Forerunner 110, 205, 301, 305, 310XT, 405, 405CX, and Garmin Edge 305, 605, 705, 500), a mobile phone, such as a smart phone (e.g., an Android based device or Apple iPhone device) including a GPS recording application (e.g., MotionX, Endomondo, and RunKeeper), a computer, a tablet device, and/or other general purpose computing devices and/or specialized computing devices, which typically include a general processor, a memory or other storage component(s), a network or input/out (I/O) capability, and possibly integrated GPS functionality or support or an interface for a GPS device or GPS functionality.

In various embodiments, device 102 (or an application thereof) is configured to record GPS information and data associated with a physical activity during the activity. In some embodiments, device 102 is configured to receive recorded GPS information and data associated with a physical activity subsequent to the completion of the activity (e.g., such information is uploaded to device 102). In some embodiments, the recorded GPS information and the associated data is referred to as an "effort." Put another way, an effort is an instance of a physical activity and can be represented through its geographical information as well as other metrics related to athletic performance. Examples of a physical activity include cycling, running, and skiing. In some embodiments, GPS information includes a series of consecutive and discrete GPS data points (e.g., longitudinal and latitude coordinates) with a timestamp for each point. In some embodiments, associated data includes, but is not limited to, elevation, heart rate, power/watts (e.g., energy expended), time, speed (e.g., average and/or maximum speed per segment and/or route, in which average speed, for example, can be derived from time and GPS information), and/or cadence. Associated data can be recorded at various granularities. For example, associated data can correspond to each GPS data point, the entire activity (e.g., the associated data includes averages of the metrics), or portions of the activity. As an example, one can use device 102 on a bike ride. At the end of the bike ride, the user can review his performance with the recorded GPS information (e.g., through a user interface of device 102) to observe the geographical track that he traversed, how much he energy he expended along the ride, how fast he finished it in, average speed, elevation based metrics, and/or other metrics. In some embodiments, device 102 is configured to store the recorded GPS information and the associated data (e.g., effort) and/or send the effort information to server 106. In some embodiments, device 102 is configured to present an interactive user interface. The user interface may display GPS information and receive selections (e.g., made by a user) with respect to the displays. In some embodiments, device 102 sends the selections that it receives to segment matching server 106.

In various embodiments, segment matching server 106 is configured to support and present a user interface at device 102. In some embodiments, segment matching server 106 is configured to receive a user defined segment at the user interface using a recorded effort. A segment refers to a geographical track that is of interest and can be used as a reference for comparisons of athletic performance along that geographical track. Segment matching server 106 is configured to receive a series of GPS information and associated data (e.g., effort). In some embodiments, segment matching server 106 is configured to display a visual representation of the GPS information at the user interface using a map software application. The visual representation can be, for example, a series of flags or a continuous line marked on a graphical map. In some embodiments, segment matching server 106 is able to support a map at the user interface by including logic configured to interact with the Application Programming Interface (API) of a map software/application (e.g., Google Maps, MapQuest, Bing maps, and/or another mapping application/service). In some embodiments, a user may define a segment using the visual representation of the GPS information. In some embodiments, a start point and a finish (e.g., end) point along the visual representation of the GPS information are selected on the graphical map to define a segment. For example, a user may select (e.g., by dropping a marker or clicking) the start and/or finish points along the geographical track that he or she just traversed during a physical activity. The portion of the geographical track between the selected start and finish points is thus defined as a segment. In some embodiments, the start and finish points are stored with the defined segment. In some embodiments, the portion of the geographical track between the selected start and finish points are converted into an abstracted form and then stored in a database for storing segments. In some embodiments, the associated data that correspond to the defined segment are also stored with the segment at the database.

In some embodiments, segment matching server 106 is configured to receive a user defined segment at the user interface using selections on a map. In some embodiments, segment matching server 106 presents a graphical map (e.g., Google Maps, MapQuest) and receives a series of selections of points on the map to indicate the course of a segment. This series of selections of points on the map need not be based on a recorded effort and can be merely be any geographical track that is of interest. For example, the selected segment can be a track that a cyclist has rode over before but has not documented the ride or the selected the segment can be a track that the cyclist would like to ride on in the future. The series of selections of points on the map can be converted into a series of GPS information (e.g., coordinates). In some embodiments, the series of GPS information is converted into an abstracted form and then stored as a segment.

In some embodiments, subsequent to a definition of a segment at the user interface, stored efforts (e.g., sets of GPS information from past physical activities) are compared to the defined segment. In some embodiments, when an effort is compared against this defined segment, it is determined whether the effort matches the segment in part by checking whether the GPS information of the effort indicates that the start and finish points of the segment have been crossed. Once one or more efforts are determined to match the segment, the data associated with the efforts are retrieved and analyzed. In some embodiments, the data associated with the newly defined segment is also included in the analysis. For example, the data can be compared to determine which effort matching the segment has the fastest time of completing the segment.

Segment matching server 106 is also configured to match efforts (e.g., sets of GPS information) to segments. In some embodiments, the effort is converted into the same abstracted form of a stored segment prior to determining matches for the effort. One purpose of matching efforts to segments is to find stored instances of physical activities that have occurred across the same demarcated tracks of interest (i.e., segments). Put another way, an effort that matches a segment refers to an instance of a physical activity that has taken place along a defined track. Once the instances of physical activities that have occurred over the same segment are found, their associated information (e.g., time of completion, speed, heart rate, and/or watts) can be compared to produce certain statistics (e.g., fastest time, highest watts) regarding athletic performance by one or more individuals across the same track. In some embodiments, for a newly defined segment, segment matching server 106 is configured to compare stored efforts to the segment. In some embodiments, the associated data of efforts are stored with the segments the efforts have been determined to match. In some embodiments, segment matching server 106 is configured to receive an effort (e.g., from device 102) and to compare the effort to stored segments to find match(es). In various embodiments, once an effort is found to match a segment, their associated data are compared (e.g., the associated data of all efforts that match the segment are compared).

Figure 2A:
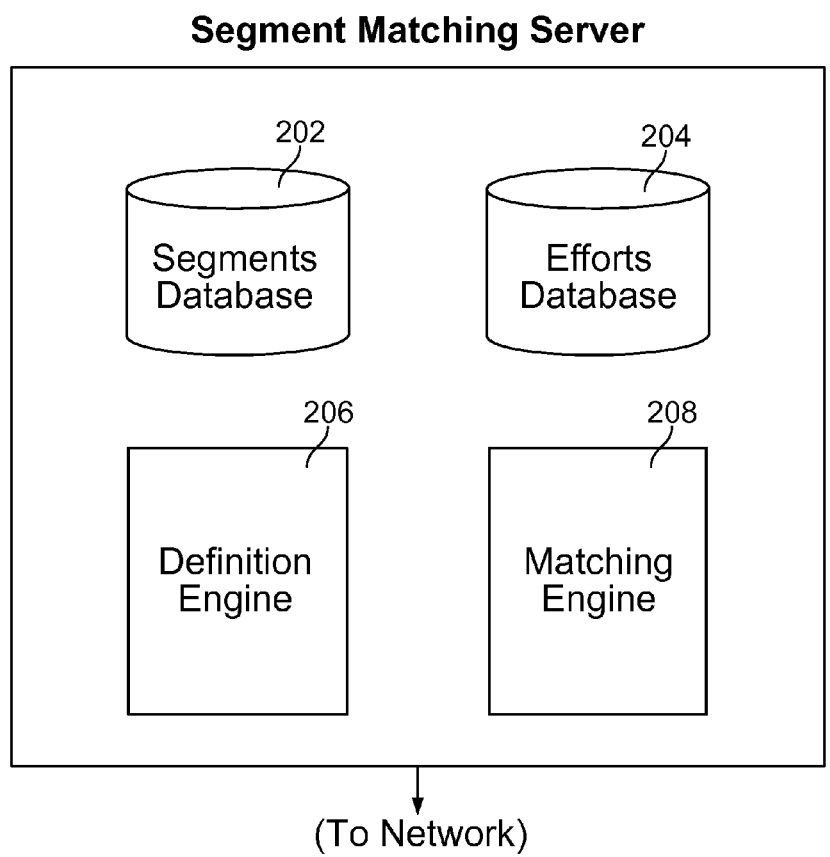
FIG. 2A is a diagram showing an embodiment of a segment matching server in accordance with some embodiments.

FIG. 2A is a diagram showing an embodiment of a segment matching server in accordance with some embodiments. In some embodiments, segment matching server 106 can be implemented with the example of FIG. 2A. In the example shown, segment matching server 106 includes segments database 202, efforts database 204, definition engine 206, and matching engine 208. However, segment matching server 106 can include more or fewer components. In some embodiments, a segment matching server is implemented using commercially available general purpose computing hardware (e.g., using a hosted service provider, such as Amazon's EC2 cloud executing a Linux operating system on commercially available servers, such as HP BladeSystem blade servers).

Segments database 202 is configured to store defined segments. While segments database 202 is shown to be one database in the example, a segments matching server may contain more than one database to store defined segments. In some embodiments, segments database 202 includes segments that are defined by users uploading a stored effort and indicating a start point and a finish/end point along a visual representation of the effort at a user interface. In some embodiments, segments database 202 includes segments defined by users making a series of selections along a track on a map at a user interface. In some embodiments, segments database 202 includes segments that are predefined (e.g., by administrators of segments server 106) based on known characteristics (e.g., information that is provided by professional associations) of various tracks or climbs. In some embodiments, segments are stored in segments database 202 in an abstracted form (e.g., as sets minimum bounding rectangles). One reason to store to store a segment in an abstracted form is so that a search query of similar segments or efforts that match segments can be efficiently performed. In some embodiments, segments data base 202 is organized based on the R-Tree index. In some embodiments, segments are stored in segments database 202 as sets of GPS data points. In some embodiments, each segment in the segments database 202 is stored with the identifiers of efforts from efforts database 204 that have been determined to match the segment. In some embodiments, each segment in the segments database 202 is stored with the associated data of the efforts that have been found to match the segment.

Efforts database 204 is configured to store efforts as sets of GPS information and timestamps. While efforts database 204 is shown to be one database in the example, a segments matching server may contain more than one database to store efforts. In some embodiments, effort database 204 includes efforts that are recorded and uploaded from devices (e.g., device 102). An effort stored at efforts database 204 includes at least GPS information, timestamps corresponding to the GPS information and metrics (e.g., associated data) related to the athletic performance of the effort. In some embodiments, the timestamps are included in the GPS information (e.g., the GPS information includes latitude and longitude coordinates with corresponding timestamps). In some embodiments, an effort is stored with an identifier for the athlete who performed the effort (e.g., the user of device 102). In some embodiments, each effort of efforts database 204 is stored with the identifiers of the segments of segments database 202 to which it has been determined to match.

Definition engine 206 is configured to receive definitions of segments. Definition engine 206 may be implemented with hardware and/or software. In some embodiments, definition engine 206 is configured to present a user interface (e.g., at a device). In some embodiments, the user interface displays a visual representation of an effort (e.g., recorded by the device) at the user interface. In some embodiments, definition engine 206 is configured to interact with third party map applications (e.g., Google Maps, MapQuest) through an API to obtain map services (e.g., displaying a map, receiving GPS coordinates of a selection on a displayed map, and/or other map services). A selection of a start point and a finish point are made at the user interface and received at definition engine 206. Then, definition engine 206 stores the track demarcated by the start and finish points as a segment at segments database 202. In some embodiments, a track (e.g., indicated as a series of selections) on a map displayed by the user interface is received at definition engine 206. Then, definition engine 206 stores the track on marked on the map as a segment at segments database 202. In some embodiments, definition engine 206 converts a segment into an abstracted geographical form (e.g., as a set of minimum bounding rectangles) before storing it.

In some embodiments, definition engine 206 is configured to compare a newly defined segment to stored segments at segments database 202 to determine whether any existing segments are similar to the newly defined segment. In some embodiments, if it is determined that existing segments are similar to a newly defined segment, a display may alert the creator of the segment of the already existing segments. In some embodiments, the creator of the new segment may opt to forgo saving the new segment since similar ones have already been defined.

In some embodiments, definition engine 206 is configured to (e.g., periodically) compare the segments stored at segments database 202 to determine groups of two or more segments are similar. In some embodiments, for segments that are found to be similar, a display is presented with the segments so that only one may be chosen (e.g., crowd source by using a voting process with a community of users who use devices such as device 102) to remain in the database. The segments that are not chosen can be discarded from the database in order to free up space by removing redundant segments or demoted so that they are not displayed as a public segment but may be retained for private use by the submitting user. In some embodiments, definition engine 206 is configured to determine that similar segments include segments that are entirely included by other segments (i.e., sub-segments and super segments). In some embodiments, a relationship between a segment and its super or sub segment noted at segments database 202.

Matching engine 208 is configured to determine efforts that match to one or more segments (e.g., of segments database 202). In some embodiments, matching engine 208 is configured to access efforts stored at efforts database 204. In some embodiments, subsequent to a user definition of a segment (e.g., based on an uploaded effort or markings on a map), matching engine 208 accesses stored efforts to match the newly defined segment. For example, a user (e.g., a cyclist) can define a segment (and optionally, publicly share the segment for other users to see) and then receive information on past activities (e.g., past rides by the cyclist himself or other cyclists) that have traversed the defined segment. In some embodiments, matching engine 208 is configured to access segments stored at segments database 204. In some embodiments, in response to a received effort (e.g., sent by device 102), matching engine 208 determines whether the received effort matches any segments stored at segments database 202. For example, a user (e.g., a cyclist) can check whether a recently recorded effort (e.g., a bike ride) included one or more already defined segments. If it is determined that the effort includes a segment, then the associated data (e.g., athletic performance data) of the segment is accessed and compared to the associated data of the effort. This way, a user can benefit from an already defined segment by automatically being able to check for whether he has traversed the segment, without needing to manually determine where the segment begins or ends.

In some embodiments, matching engine 208 is configured to convert an effort (e.g., a set of GPS coordinates) into the same abstracted form (e.g., a set of minimum bounding rectangles) in which a segment is stored prior to performing a match against the stored segments (e.g., via querying the segments database). In some embodiments, two types of determinations (e.g., the effort is a loose match, the effort is a close match) can be made based on performing a match between an effort and the stored segments. An effort can be determined to be a loose match to a stored segment if their percentage of match exceeds a first threshold (e.g., 65% or greater). In some embodiments, an effort that is a loose match to a stored segment may entail that the recorded physical activity approximately traversed the same track as the matched segment. An effort can be determined to be a tight match to a stored segment if their percentage of match exceeds a second threshold (e.g., 80%) and in addition, the effort crosses the start and finish lines associated with the stored segment. In some embodiments, an effort that is a tight match to a stored segment may entail that the recorded physical activity closely traversed the same track as the matched segment. In various embodiments, determining a percentage of match for the two determinations (e.g., loose match and tight match) is performed in the same manner. In some embodiments, an effort can be determined to be a loose match to one or more segments and the effort can also be determined to be a tight match to one or more (of the same or different) segments. For example, an effort can be determined as a loose match to a segment and it can also be determined to be a tight match to the same segment. In another example, an effort can be determined as a loose match to one segment and a tight match to a different segment. In some embodiments, a determination of an effort as a loose match is made to one or more segments stored in a first database and a determination of the effort as a tight match is made to one or more segments stored in a second, different database.

In some embodiments, in the event that an effort is determined to match a segment (e.g., either as a loose match or tight match), then the associated data of the segment (e.g., associated data of stored efforts that have been determined to match the segment) is accessed to be compared against the associated data for the effort. In some embodiments, multiple stored efforts are determined to match a newly defined segment and the associated data for the matched segments are accessed, aggregated and analyzed. In some embodiments, matching engine 208 is configured to produce analysis results based on the retrieved data. In some embodiments, matching engine 208 sends the analyzed results to device 102 (e.g., for display as a user interface).

For example, a user can define a segment and all the stored efforts that match the segment can be aggregated and analyzed to produce a list of users who have traversed the segment in the fastest times or highest power (i.e., a leader board). In another example, a user can produce an effort and the segment matching server can determine whether the effort has traversed across any defined segments. If it is determined that the effort has traversed across a defined segment, then the data associated with that effort can be compared with the history of all efforts that have been determined to have traversed the defined segment. In this way, the user can determine how his athletic performance on the segment compares to all other efforts across the same geographical track (as represented by the segment). Furthermore, the user need not know (e.g., as he is on his bike ride) where exactly the segment begins or ends.

In some embodiments, device 102 may include segments database 202, efforts database 204, definition engine 206 and matching engine 208 or equivalent functionalities such that device 102 can store segments, store efforts, define segments, and match an effort to segments at device 102 (without needing to send or receive information from segments matching server 106). In some embodiments, an efforts database at device 102 includes only the efforts produced by the user of the device.

FIG. 2B is a diagram showing an example of efforts stored in a table at the efforts database in accordance with some embodiments. In some embodiments, the efforts stored at efforts database 204 can be stored in a manner similar to the example of FIG. 2A. However a table of efforts at a database can include more or fewer columns than the ones shown in the example. In the example, each effort is stored with an effort ID, its series of GPS information (e.g., GPS coordinates with respective timestamps), an identifier associated with the user who recorded the effort, the date the effort was recorded, and associated data including speed (km/h), heart rate (beats per minute), power (watts), and time (hours: minutes). In some embodiments, when an effort is compared to a segment, the GPS information (e.g., the series of GPS coordinates with timestamps) of the effort is accessed and used for the comparison. In some embodiments, when an effort is determined to match a segment, the associated data (e.g., speed, heart rate, power, time, elevation, grade) for the effort is aggregated with the associated data of other efforts (if any) that also match the segment. The aggregated data is then analyzed (e.g., to produce displays that summarize the aggregated data).

Figure 3:
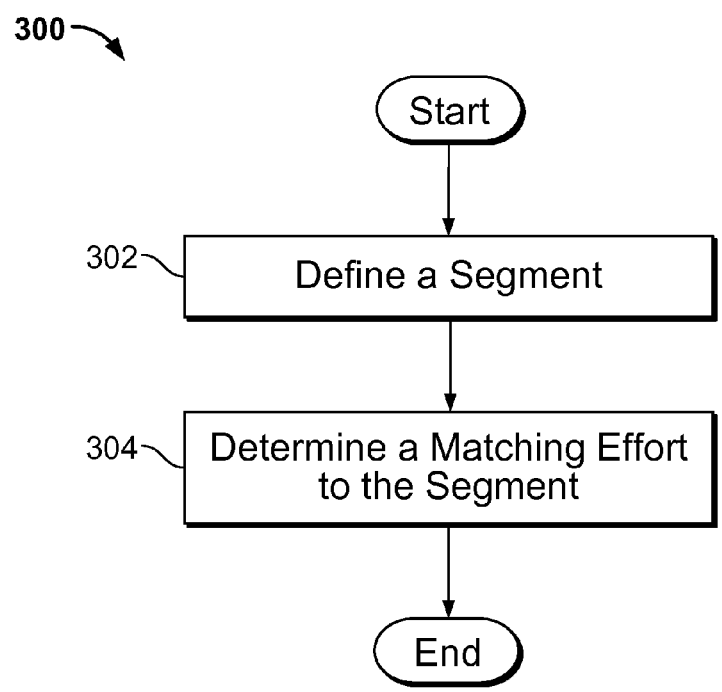
FIG. 3 is a flow diagram showing an embodiment of a process for segment matching in accordance with some embodiments.

FIG. 3 is a flow diagram showing an embodiment of a process for segment matching in accordance with some embodiments. In some embodiments, process 300 is implemented on system 100.

At 302, a segment is defined. In some embodiments, a segment is defined by a user at a user interface by selecting a start and end point along a visual representation of an effort (e.g., series of GPS information with timestamps). In some embodiments, the effort is recorded by a device equipped with a GPS-tracking functionality. In some embodiments, a segment is defined by a user at a user interface by selecting a series of points on a map (e.g., supported by a third party map software such as Google Maps). In some embodiments, a segment is defined (e.g., by administrators of a segments matching server) using known characteristics (e.g., elevation and average grade) of a geographical track. Defined segments are stored in one or more databases. In some embodiments, a defined segment is converted into an abstracted form (e.g., as a set of minimum bounding rectangles) and stored in their abstracted forms. In some embodiments, a database in which segments are stored is organized based on the R-Tree index.

At 304, a matching effort to the segment are determined. In some embodiments, for a defined segment, information regarding stored efforts are accessed and compared against the segment. In some embodiments, efforts are stored as sets of GPS information with timestamps (and with associated data such as various metrics of athletic performance). In some embodiments, the GPS information of the stored efforts are accessed and converted into whichever form the segment is in (e.g., minimum bounding rectangles) before the comparisons are made. In some embodiments, stored efforts are compared against the segment to determine a subset of stored efforts that match the segment. The associated data for the subset of stored efforts that are found to match the segment are accessed (e.g., from the same database that stores the efforts) and aggregated. The aggregated associated data is analyzed and in some embodiments, the result(s) of the analysis is presented in table(s) (e.g., leader boards) and/or visual(s).

Figure 4:
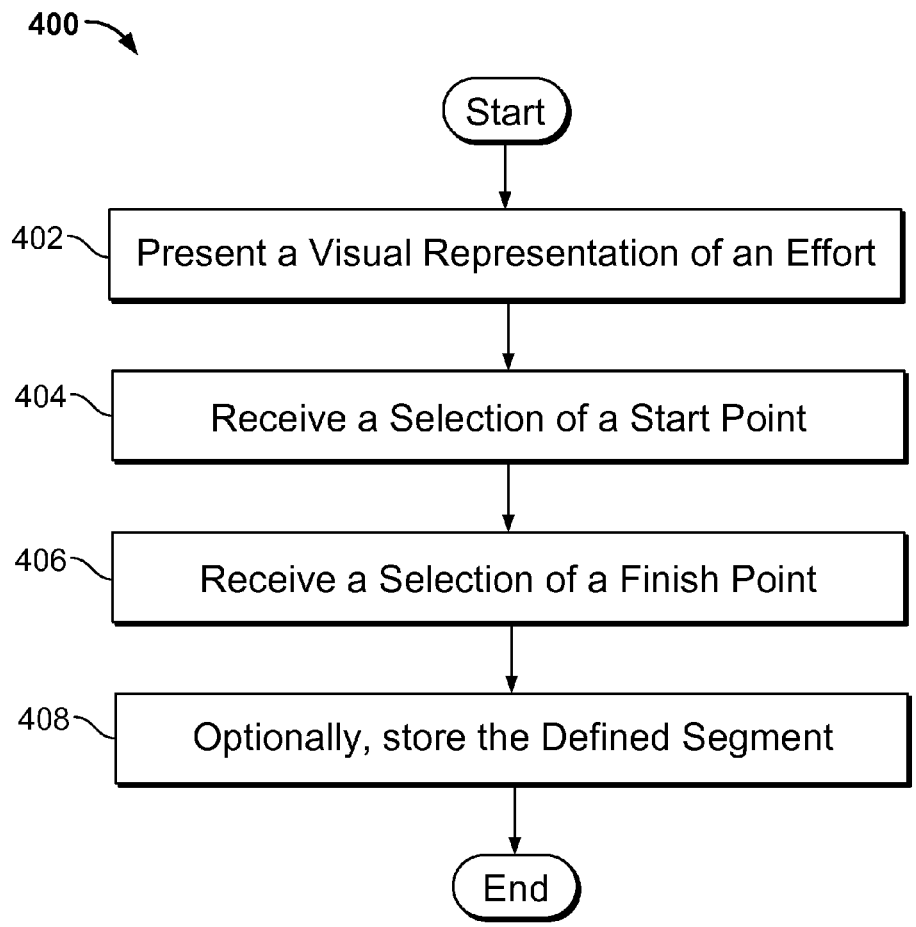
FIG. 4 is a flow diagram showing an embodiment of the process of defining a segment based on an effort in accordance with some embodiments.

FIG. 4 is a flow diagram showing an embodiment of the process of defining a segment based on an effort in accordance with some embodiments. In some embodiments, process 400 can be implemented using system 100. In some embodiments, process 400 can be used to implement 302.

At 402, a visual representation of an effort is presented. In some embodiments, the effort is a series of GPS information with timestamps that is recorded by a device equipped with GPS-tracking functionality. In some embodiments, the visual presentation is presented at a user interface. For example, the GPS coordinates can be displayed as a continuous line on a map or a series of markers on a map (e.g., supported by a map application such as Google Maps). In some embodiments, even though a series of GPS information is a set of discrete geographical coordinates, the points in between two coordinates can be extrapolated in producing a visual representation that is in the form a continuous line.

For example, a user (e.g., a cyclist) has completed a bike ride and would like to designate at least a portion of the ride as a segment. This way, the cyclist or other cyclists may be able to track and compare their performances across the geographical track that is referenced by the segment.

At 404, a selection of a start point is received. In some embodiments, a user selects a point along the visual presentation at the user interface to be the start point of the segment. In some embodiments, if the selected point has been crossed more than once in the effort, then a display is generated to indicate each of the times along the effort that the selected start point was crossed. The user may then select the time corresponding to the desired instance that he or she would like to represent as the start point. In some embodiments, the selected start point is stored as its corresponding GPS coordinates (e.g., as returned by an API associated with the map application). In some embodiments, the selected start point is stored with a virtual starting line that is derived based on the selected start point and other point(s) of the effort.

Returning to the previous example, the cyclist can select a point along his ride to designate as the starting point of the segment. The start point need not be at the starting point of the entire segment, but can be any point along the ride. The start point can be thought of as the starting line for a race. When it is later determined whether another cyclist (or the same cyclist on a different occasion) has rode over the segment, it is determined whether the subsequent ride (i.e., effort) has crossed the starting point.

At 406, a selection of a finish point is received. In some embodiments, a user selects a point along the visual presentation at the user interface to be the finish or end point of the segment. In various embodiments, the technique for selecting and storing a finish point is the same as that is used for a start point. For example, a selected finish point can be stored as its corresponding GPS coordinates and/or with a derived virtual finish line.

Returning to the example, the cyclist can select a point along his ride to designate as the finish point of the segment. The finish point need not be at the very end of the ride, but can be any point that is subsequent to the start point. The finish point can be thought of as a finish line for a race. When it is later determined whether another cyclist (or the same cyclist on a different occasion) has rode over the segment, it is determined whether the subsequent ride (i.e., effort) has also crossed the finish point.

At 408, the defined segment is optionally stored. In some embodiments, if the defined segment is determined to be similar to already existing segments (e.g., in a data store that includes predefined and/or user defined segments, such as a segment database), then the user is prompted with a corresponding display. In some embodiments, the user can review the existing segments and/or choose to discard the newly defined segment in light of the existing, overlapping segments. In the event that the user chooses to discard the newly defined segment, he or she can choose to associated his effort with an existing segment and store the data associated with his effort with the existing segment. In some embodiments, if the user defined segment matches an existing segment, then the matched existing segment is already stored (e.g., in a data store that includes predefined and/or user defined segments, such as a segment database). If there are no existing similar segments or if the user chooses to store the newly defined segment anyway despite a possible overlap, the newly defined segment is stored. In some embodiments, the segment is converted into an abstracted form (e.g., as a set of minimum bounding rectangles) and then stored. In some embodiments, the newly defined segment can be saved with a name and/or one or more tags (e.g., that are chosen by the user). In some embodiments, stored efforts are accessed to match against this segment. If/when matching efforts are found; the data associated with the matching efforts are combined and compared.

Returning to the example, the cyclist can use the user interface to create the segment. The cyclist can also input the segment name as "Old La Honda" to associate the segment with the name of the road along which the segment exists. The cyclist can also receive feedback on past rides that have occurred on the "Old La Honda," (e.g., as determined by segment matching) such as which users have rode on the segment, when, who had the fastest time, who expended the most amount of energy in completing the segment. The cyclist can also see how his own performance over the "Old La Honda" fares in comparison to past rides (e.g., where the user's performance ranks among the history of rides over the segment). Subsequent users can also search for this segment by entering in "Old La Honda" at a user interface that supports searching through a segments database. Subsequent users can also check to see if they have ridden over "Old La Honda" by recording a ride and sending the ride to be checked for matching segments. If it is determined (e.g., as determined by segment matching), that the ride includes the "Old La Honda" segment, then the subsequent user's performance during the ride for the length of the segment can be compared to the historical performance of the other users who have ridden over the segment.

Figure 5:
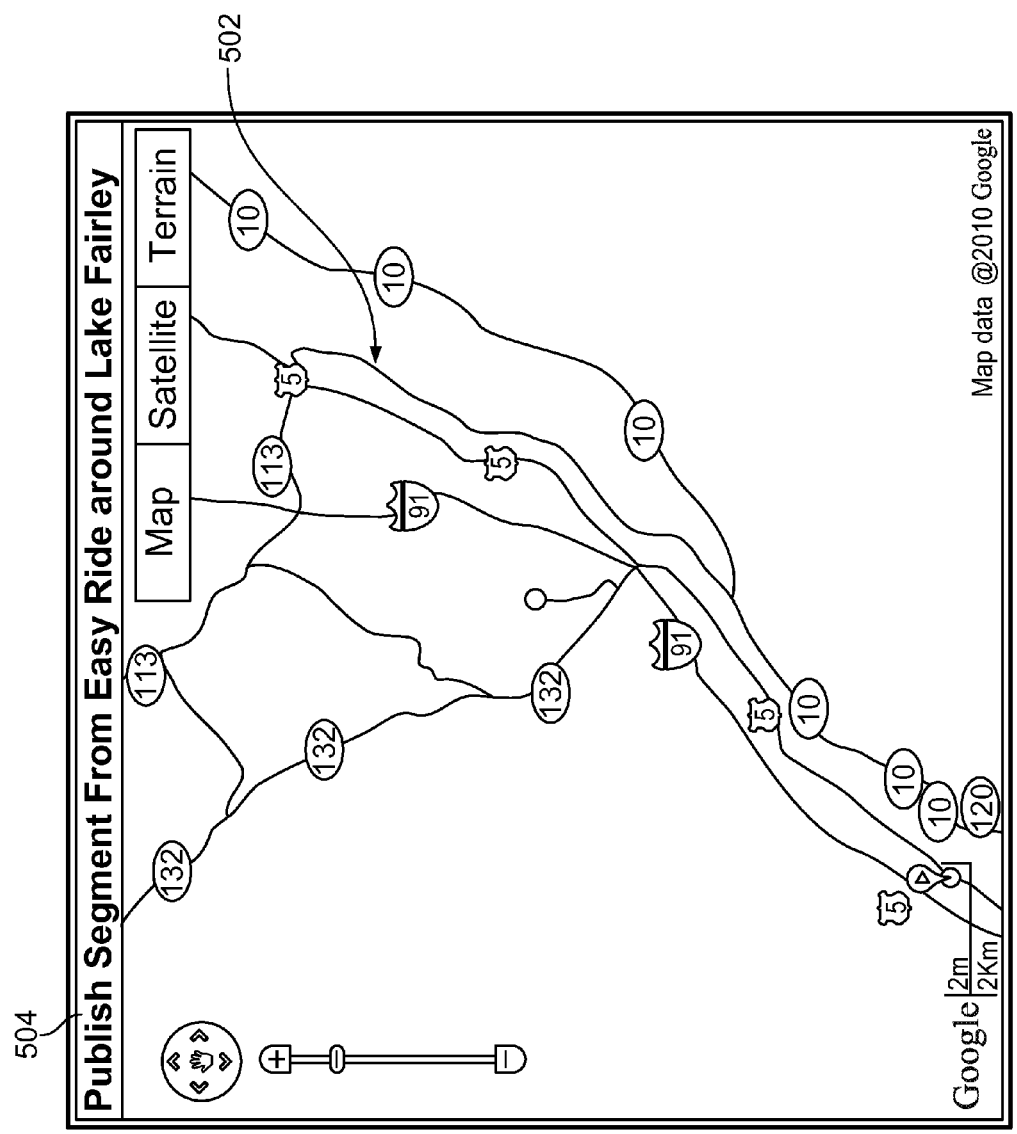
FIG. 5 is a diagram showing an example of a user interface for defining a segment based on an effort in accordance with some embodiments.

FIG. 5 is a diagram showing an example of a user interface for defining a segment based on an effort in accordance with some embodiments. In some embodiments, 402 is implemented using the example of FIG. 5. In the example shown, the dark line located on the map is visual presentation 502 that is rendered from, for example, an effort (e.g., a series of GPS information with timestamps) recorded by a GPS device. As shown in the example, the name of the effort from which a segment is to be selected is indicated in area 504 as "Easy Ride around Lake Fairley." In some embodiments, the map used in the user interface is supported by a map application such as Google Maps. The map application can be interacted through an associated API.

Figure 6:
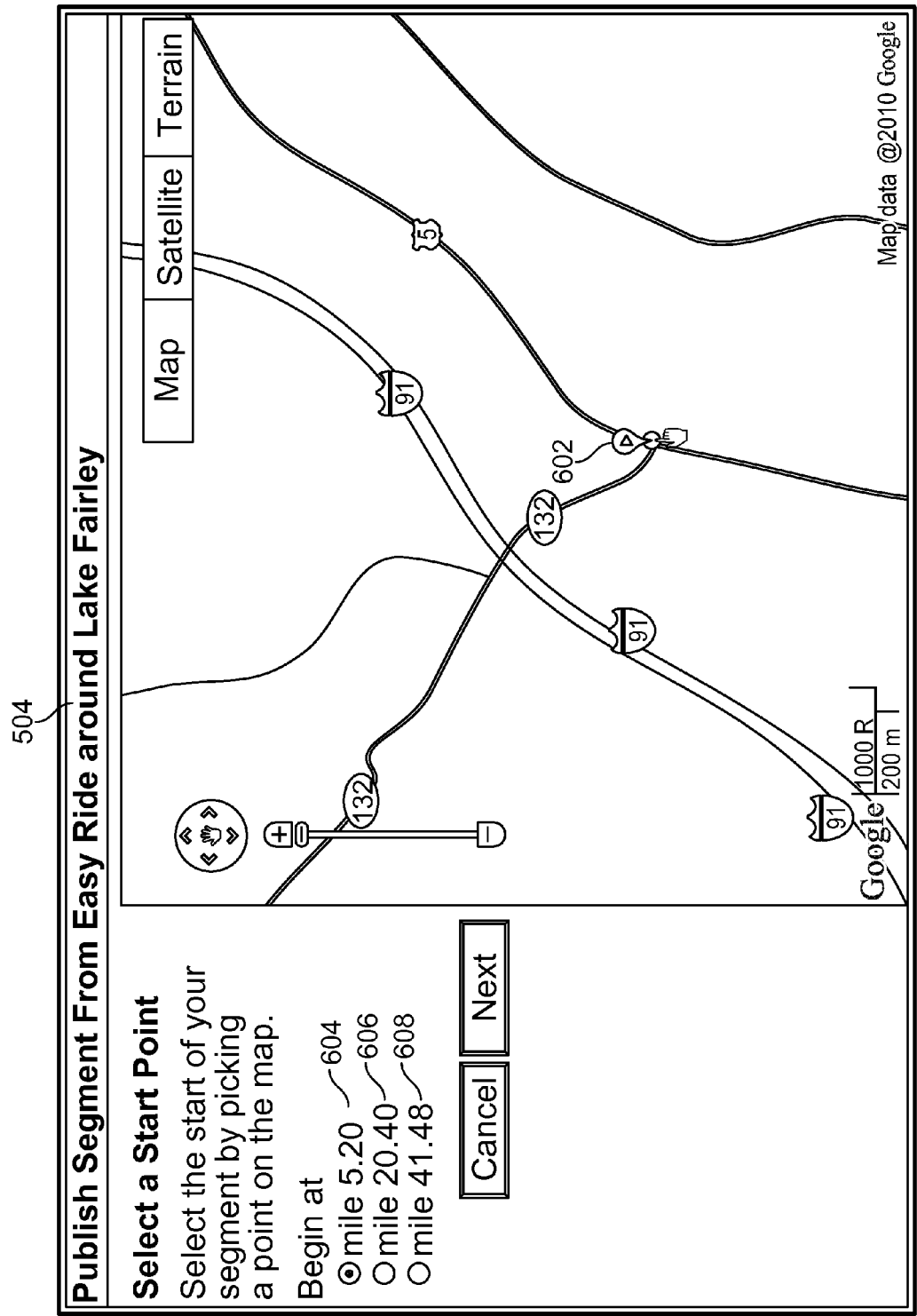
FIG. 6 is a diagram showing an example of a user interface showing a selection of a start point for a segment in accordance with some embodiments.

FIG. 6 is a diagram showing an example of a user interface showing a selection of a start point for a segment in accordance with some embodiments. In some embodiments, 404 is implemented using the example of FIG. 6. In the example shown, the map showing visual presentation 502 is zoomed in on an area in which the start point is to be selected. In some embodiments, the start point can be selected through clicking on a location of the map. In the example shown, marker 602 indicates the selected start point along the effort. In the example shown, the selected start point was crossed at three different times (604, 606, and 608) along the effort. The user is prompted to select the desired time to set as the start point. In some embodiments, the user is prompted to select one of multiple possible start points because the length of the defined segment is determined based on the length of the effort in between the start and finish points. In some embodiments, the selected start point is stored as a GPS coordinate. In some embodiments, the selected start point is stored with a virtual starting line derived in part from the start point.

Figure 7:
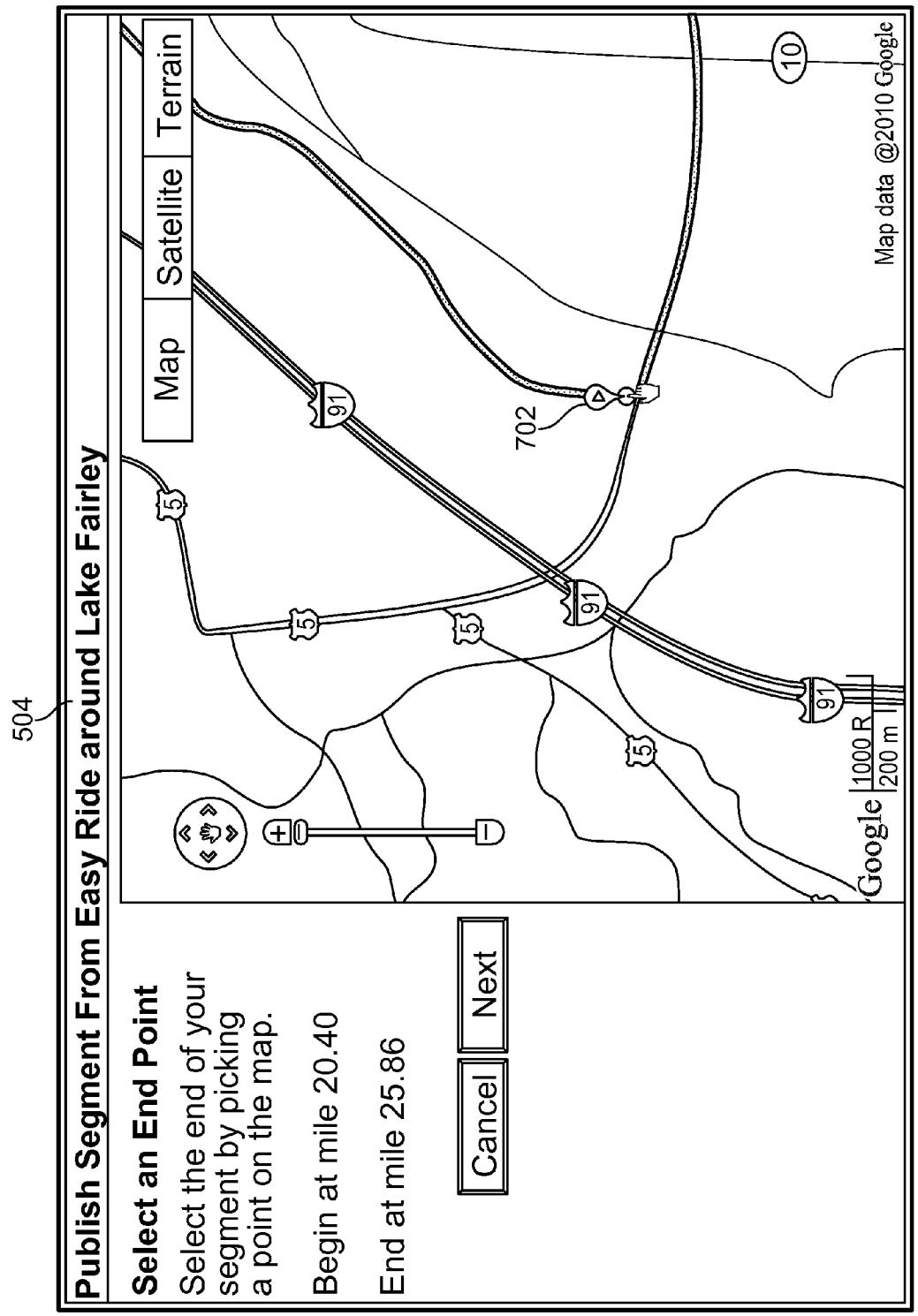
FIG. 7 is a diagram showing an example of a user interface showing a selection of a finish point for a segment in accordance with some embodiments.

FIG. 7 is a diagram showing an example of a user interface showing a selection of a finish point for a segment in accordance with some embodiments. In some embodiments, 406 is implemented using the example of FIG. 7. In some embodiments, a finish point is selected and also stored by the same techniques used for a start point. In the example shown, marker 703 indicates the selected finish (e.g., end) point of the segment. In some embodiments, the selected finish point is stored as a GPS coordinate. In some embodiments, the selected finish point is stored with a virtual finish line derived in part from the finish point.

Figure 8:
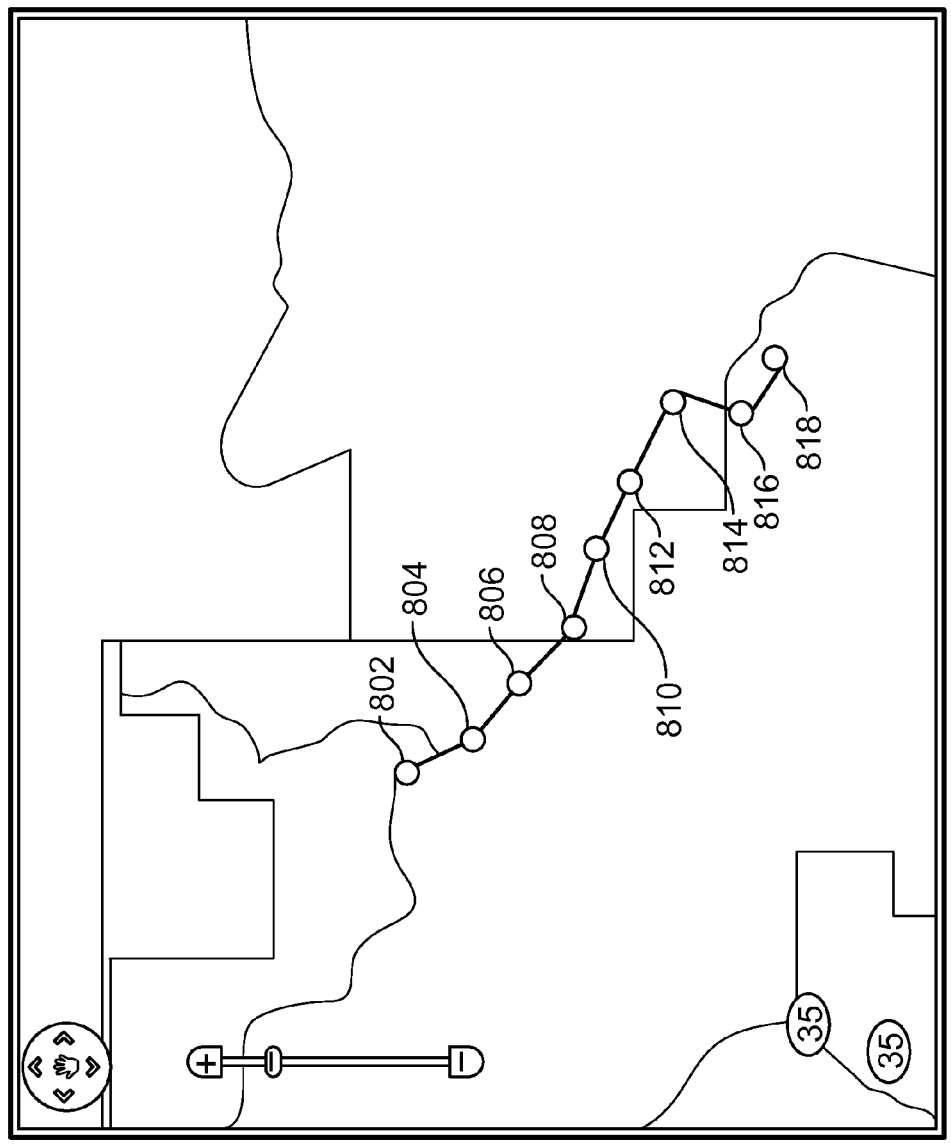
FIG. 8 is a diagram showing an example of a user interface for defining a segment using a series of selections on a map in accordance with some embodiments.

FIG. 8 is a diagram showing an example of a user interface for defining a segment using a series of selections on a map in accordance with some embodiments. In some embodiments, the example shown can be used to implement 302. In some embodiments, a segment can be defined through directly making selections on a map at a user interface. As opposed to the technique of defining a segment as shown in FIGS. 5, 6, and 7, the technique of defining a segment in the example of FIG. 8 does not require a recorded effort. In the example shown, a user has sequentially dropped markers 802 to 818 along a track (e.g., "Montebello Rd") on the map to indicate a segment. The set of geographical information of markers 802 to 818 can be obtained from the map application (e.g., Google Maps) and stored as a segment. In some embodiments, the first dropped marker for the segment is considered to be the start point and the last dropped marker is considered to be the finish point.

Figure 9:
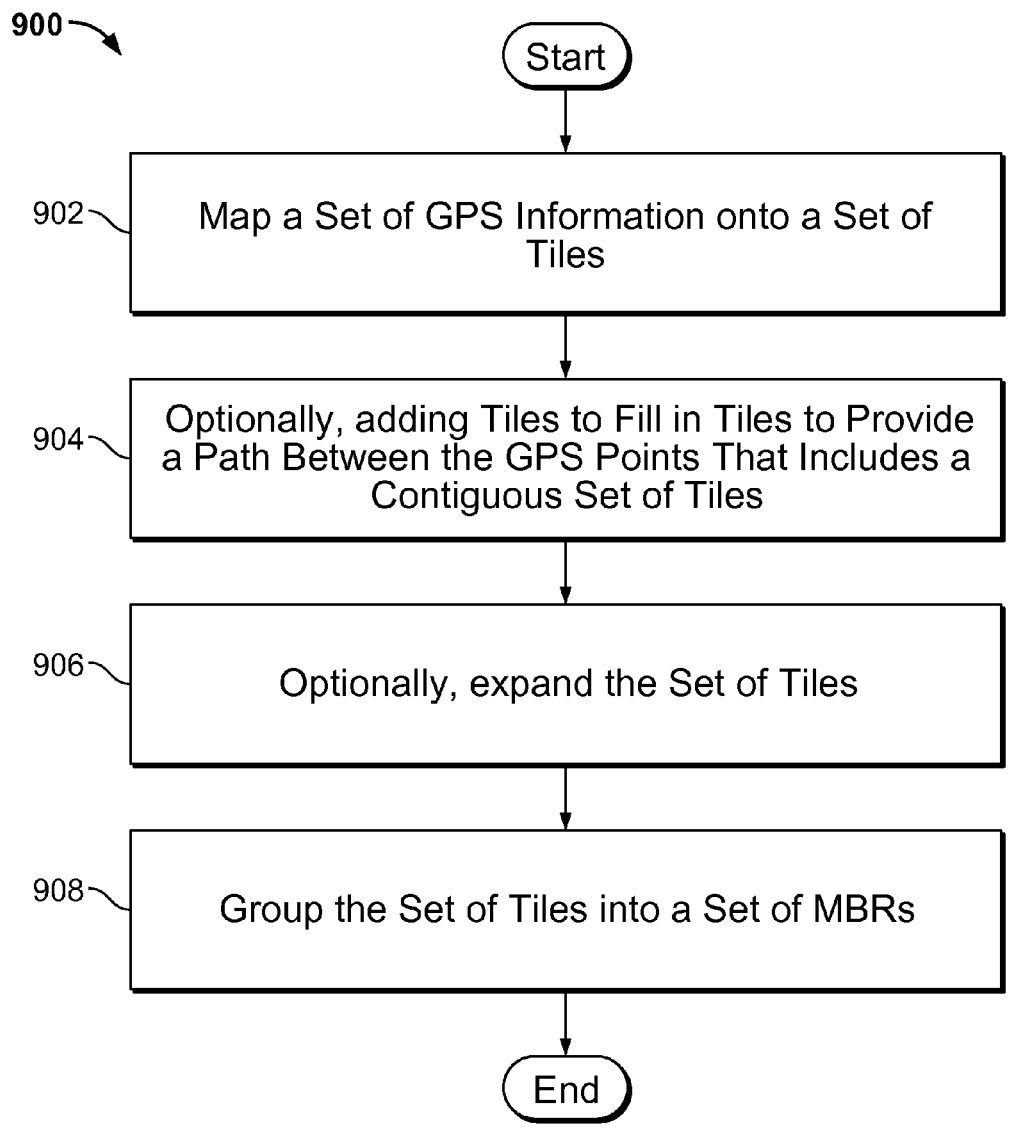
FIG. 9 is a flow diagram showing an embodiment of converting a series of GPS information into a set of minimum bounding rectangles (MBRs) in accordance with some embodiments.

FIG. 9 is a flow diagram showing an embodiment of converting a series of GPS information into a set of minimum bounding rectangles (MBRs) in accordance with some embodiments. In some embodiments, a series of GPS information (e.g., used to define a segment based a recorded effort, for a series of selections on a map supported by a map application) are converted into a set of minimum bounding rectangles (MBRs) to be stored for a segment. In some embodiments, a series of GPS information are converted into a set of MBRs to be used for querying a R-Tree indexed database of segments that are stored as sets of MBRs.

One reason to convert a series of GPS information into a set of MBRs is that in various embodiments, MBRs can be used to perform an efficient bounding box query on an R-Tree indexed database of MBRs. In some embodiments, a search input for a query of a R-Tree database (e.g., for defined segments) is a MBR (e.g., associated with an effort) and the query returns MBRs (e.g., associated with segments) that overlap the input MBR. In some embodiments, whether an effort is similar to (e.g., matches) a segment depends on the extent that their MBRs are found to overlap using the bounding box query. In some embodiments, whether one segment is similar to another segment also depends on the extent that their MBRs overlap.

At 902, a series of GPS information is mapped on to a set of tiles. In some embodiments, the series of GPS information is from an effort recorded by a device equipped with GPS-tracking functionality. In some embodiments, the series of GPS information corresponds to a segment (e.g., defined at a user interface).

A known technique of universal tiling is used to divide an area of geography that is of interest into generally uniform tiles. For example, each tile can be 20 meters by 20 meters. This universal tiling scheme is applied to the series of GPS information to result in a set of corresponding tiles. For example, each tile that contains a GPS coordinate (and also any tiles in between two such tiles) is included in the set of tiles. In some embodiments, any two geographic tracks covering roughly the same terrain will map to the same set of universal tiles despite small differences in their respective sets of GPS information.

At 904, optionally, tiles are added to fill in tiles to provide a path between the GPS points that includes a contiguous set of tiles. For example, if two consecutive GPS points do not map to adjacent tiles, then any tiles traversed by the line connecting the consecutive GPS points can be added to the set of tiles (e.g., filling in the tiles between the GPS points before expansion).

At 906, optionally, the set of tiles is expanded. In some embodiments, the set of tiles can be expanded to encompass adjacent tiles to compensate for differences in GPS data. For example, the adjacent eight tiles of each tile in the set of tiles produced at 902 can be included in the set of tiles, if they are not already included. However, the set of tiles can be expanded in other appropriate ways as well.

At 908, the set of tiles are grouped into a set of MBRs. In some embodiments, tiles in the set that are close to each other are grouped into one MBR. In some embodiments, each dimension (e.g., height, width) of a MBR is a one or more entire tiles. For example, to group a set of tiles into a set of MBRs, the tiles of the set are first merged into a set of non-overlapping rectangular boxes. In one approach, cells that adjoin horizontally are merged into a set of wide boxes, each one tile tall. Next, each box is then compared to the boxes on the row below, and if there is a box of the same width and horizontal position, they are merged. The resulting set of boxes is the desired set of MBRs. However, grouping the set of tiles into a set of MBRs is not limited to only the previous example.

In some embodiments, each MBR is identified by the coordinates of its four respective corners (e.g., on the tiling scheme). In some embodiments, the set of MBRs is stored at a database for segments. For example, the MBRs of the set can be stored in rows of a R-Tree indexed database table. The MBRs of the set can also be stored with an identifier associated with the segment they represent.

However, in some embodiments, a segment can be stored as the corresponding set of GPS data points (as opposed to being converted into MBRs and then stored).

Figure 10A:
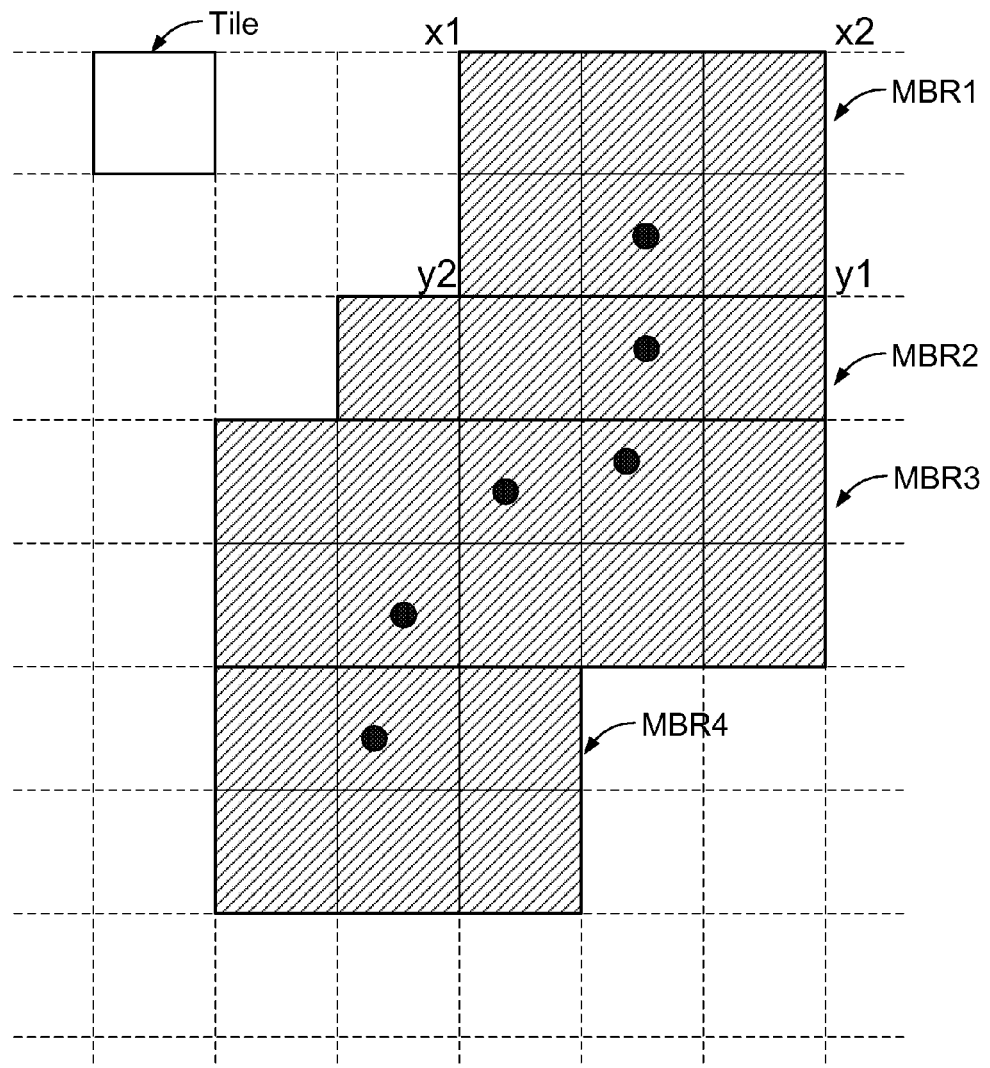
FIG. 10A is a diagram showing an example of converting a series of GPS information into a set of MBRs in accordance with some embodiments.

FIG. 10A is a diagram showing an example of converting a series of GPS information into a set of MBRs in accordance with some embodiments. In some embodiments, the example of FIG. 10A is a result of applying process 900 to a series of GPS information. In the example shown, a recorded bike ride includes a set of GPS coordinates, which are represented by the small, black circles. Each tile of the universal tiling scheme that includes a GPS coordinate is included in the set of tiles to which the GPS information is mapped as well as any tiles traversed by line segments that connect consecutive GPS points. In the example shown, a tile included in the set of tiles is shaded in. The adjacent eight tiles of each tile in the set are also included in the expanded set of tiles (if the tiles have not been previously included). The expanded set of tiles is then grouped into four MBRs (which are identified by MBR 1, MBR 2, MBR 3, and MBR 4). In the example shown, each MBR is outlined by a dark border. Each MBR can be identified by the set of coordinates (x1, x2, y1, y2) (e.g., of the tiling scheme) that represent its four corners. If the series of GPS information is intended to define a segment, then the corresponding set of MBRs can be stored, in some embodiments, in a table at a R-Tree indexed database with the identifier of the segment.

FIG. 10B is a diagram showing an example of entries of a database table for storing segment information in accordance with some embodiments. In some embodiments, the database is a R-Tree indexed database. For example, the database can be MySQL, Oracle, or Postgres. In some embodiments, the example of FIG. 10B includes the stored set of MBRs created in the example of FIG. 10A. In some embodiments, each segment in a segments database is stored with an alphanumeric identifier. Assume that the example of FIG. 10A created a set of MBRs for the segment with the identifier of "Old_La_Honda." As shown in the example of FIG. 10B, each MBR is stored with its segment identifier, its four coordinates, and a fill ratio. In the example shown, a fill ratio refers to the number of tiles associated with the segment that are included in the MBR over the total number of tiles associated with the segment. In some embodiments, the fill ratio can be represented as a percentage. For example, as shown in FIG. 10A, there were 26 shaded-in tiles and thus 26 tiles associated with the segment "Old_La_Honda." Since there are six of those 26 tiles enclosed within MBR1, the fill ratio entry for MBR1 in the database is "6/26."

While the example of FIG. 10B includes only four entries (for each of the MBRs in the set) for a segment, an actual segment may include thousands of entries at the database, depending on the length of the track. In some embodiments, entries of a database for storing segment information can include more or fewer columns than the ones shown in the example of FIG. 10B. In some embodiments, a set of information for a segment stored at a database includes all the efforts (e.g., from an efforts database) and their associated data that have been determined to match the segment. That way, when a segment is retrieved from a database, a history of athletic performance (e.g., as represented by the matched efforts and their associated data) can be quickly accessed as well.

Figure 11A:
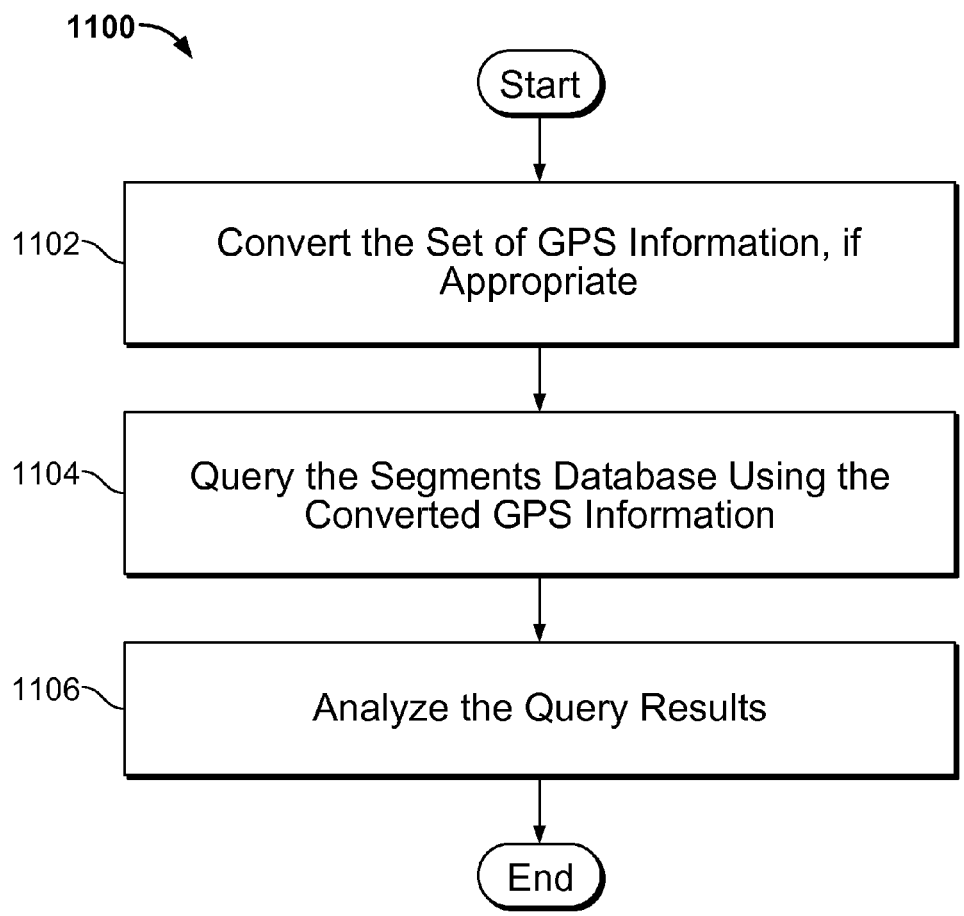
FIG. 11A is a flow diagram showing an embodiment for the process of searching for matching segments at a segments database in accordance with some embodiments.

FIG. 11A is a flow diagram showing an embodiment for the process of searching for matching segments at a segments database in accordance with some embodiments.

In some embodiments, a segment is stored as a set of MBRs in a R-Tree indexed database. In some embodiments, a segment is stored as a set of GPS data points in a database.

In some embodiments, a segments database is queried to determine whether the query input (e.g., a geographical track that is represented by a series of GPS data points) matches to a defined segment at the database. As used herein, a series of GPS information (e.g., belonging to an effort) matches to another series of GPS information (e.g., belonging to a segment) when their percentage of match exceeds a certain threshold.

At 1102, a series of GPS information is converted, if appropriate. In some embodiments, the series of GPS information is extracted from an effort (e.g., recorded by a GPS-enabled device). In some embodiments, the GPS information is a series of consecutive GPS data points. In some embodiments, the segments are stored in an abstracted form such as a set of MBRs. If the segments are stored as sets of MBRs, then the series of GPS information is also converted into a set of MBRs. In some embodiments, segments are stored as set of GPS data points so the GPS information does not need to be converted into another form.

At 1104, the segments database is queried using the GPS information. In some embodiments, a query of the database returns portions (e.g., GPS data points, MBRs) of segments that are similar to the series of GPS information.

In some embodiments, the segments are stored as sets of MBRs at a R-Tree indexed database. For example, to search at the database, the MBRs converted from the GPS information are used to perform a bounding box query on the R-Tree indexed database. The query returns MBRs that overlap with the input MBRs. Overlapping MBRs are considered to be similar. For overlapping MBRs, their respective entries from a table (e.g., table 1000 of FIG. 10B) at the database can be returned. Referring to table 1000, in this example, assume that MBR1, MBR2, and MBR3 (which all belong to segment "Old_La_Honda") have been found to overlap. Thus, the respective rows for MBR1, MBR2, and MBR3 can be returned so that their entries may be analyzed (e.g., to determine whether the set of input MBRs matches to the segment of "Old_La_Honda"). In some embodiments, overlapping MBRs associated with more than one segment may be returned.

In some embodiments, the segments are stored as sets GPS data points at a database. Various search techniques for determining similar series of GPS data points (e.g., within a tolerance) may be employed to find similar segments at the database. In one example technique, each GPS data point at the database is assumed to include a tolerance zone that is indicated by a radius of a selected length (e.g., 50 meters). Each point in the series of GPS information is also assumed to include a tolerance zone that is indicated by a radius of a selected length, which can be the same length as the radius of a point at the database. As a result, each GPS data point can be thought of as spanning a circle of area. Subsequently, the circular area of each point in the series of GPS information is used to search for an overlapping circle associated with a GPS data point (associated with a segment) at the database. In some embodiments, GPS data points of the database that correspond to the overlapping circles can be returned. In some embodiments, GPS data points associated with more than one segment may be returned.

In some embodiments, searching for similar segments using a series of GPS data points requires more computational time and/or resources than is needed for using MBRs and a R-Tree indexed database.

1106, the query results are analyzed. In some embodiments, the query results are used to determine whether the series of GPS information matches any segments at the database. In some embodiments, a calculation is performed to determine the percentage of match between the series of GPS information and the returned (portions of) one or more segments.

In some embodiments, when the segments are stored as MBRs, the percentage of match is determined using the returned MBRs. In some embodiments, the percentage of match of a series of GPS information to a segment is calculated based on the ratio between the number of overlapped MBRs of the segment to the total number of MBRs for the segment. If the ratio exceeds a threshold, then the geographical track represented by the series of GPS information is considered to match the segment. In some embodiments, the similarity of a series of GPS information to a segment is calculated based on the sum of the fill ratios of the returned MBRs. If the sum of the fill ratios exceeds a threshold, then the geographical track represented by the series of GPS information is considered to match the segment. In some embodiments, MBRs returned as a result of the query (e.g., 1104) include their respective rows from a table at the database. Referring to the table of FIG. 10B, in this example, assume that that MBR1, MBR2, and MBR3 (all belonging to segment "Old_La_Honda") have been found to overlap. Thus, the respective rows for MBR1, MBR2, and MBR3 are returned. In this example, the similarity between the series of GPS information and the "Old_La_Honda" segment is calculated based on the sum of the fill ratios for the overlapped MBRs. Since MBR1, MBR2, and MBR3 are overlapped, the sum of their respective fill ratios (i.e., 6/26+4/26+10/26) is 20/26 or about 76.9%. If the threshold percentage for a match is 65%, then the series of GPS information is considered to match the "Old_La_Honda" segment. In some embodiments, MBRs can be returned for more than one segment and the similarity to each of those segments can be determined.

In some embodiments, when the segments are stored as sets of GPS data points, the percentage of match is determined based on the number of GPS data points that are returned by the query. In some embodiments, if the ratio of the number of GPS data points returned by the query to the total number of GPS data points associated with the segment exceeds a certain threshold, then the geographical track represented by the series of GPS information is considered to match the segment. In some embodiments, GPS data points can be returned for more than one segment the percentage of match to each of those segments can determined In some embodiments, if the percentage of match between the series of GPS information falls below a threshold (e.g., 65%), then the geographical track is considered to not match the segment. In some embodiments, there are multiple thresholds for which a series of GPS information can match a segment. In some embodiments, a series of GPS information can match a segment at lower threshold (e.g., between 65% to 79%) and be considered as a loose match of the segment. In some embodiments, a series of GPS information can match a segment at a higher threshold (e.g., between 80% and 100%) and be considered as a candidate to be a close match of the segment. In some embodiments, to be considered to a close match of the segment, not only does the series of GPS information need to match the segment at a higher threshold, but the series of GPS information also needs to cross the virtual starting and finish lines of the segment. When a series of GPS information is considered to be a loose match to a segment, it implies that the geographical track (e.g., effort) associated with the GPS information does not closely follow the track referenced by the segment. For example, a cyclist who intends to take a leisurely bike ride along the general terrain demarcated by a segment can deviate somewhat from the exact segment. When a series of GPS information is considered to be a tight match of the segment, it implies that the geographical track associated with the GPS information has closely followed the track referenced by the segment. For example, a cyclist who intends to compete his time (or another performance metric) across a segment against his own record or the performances of others would need to follow more closely to the region demarcated by a segment. Also, the cyclist who aims to compete his time would need to cross the virtual start and finish lines of the segment to ensure that the full length of the segment (rather than only a portion thereof) was traveled.

Figure 11B:
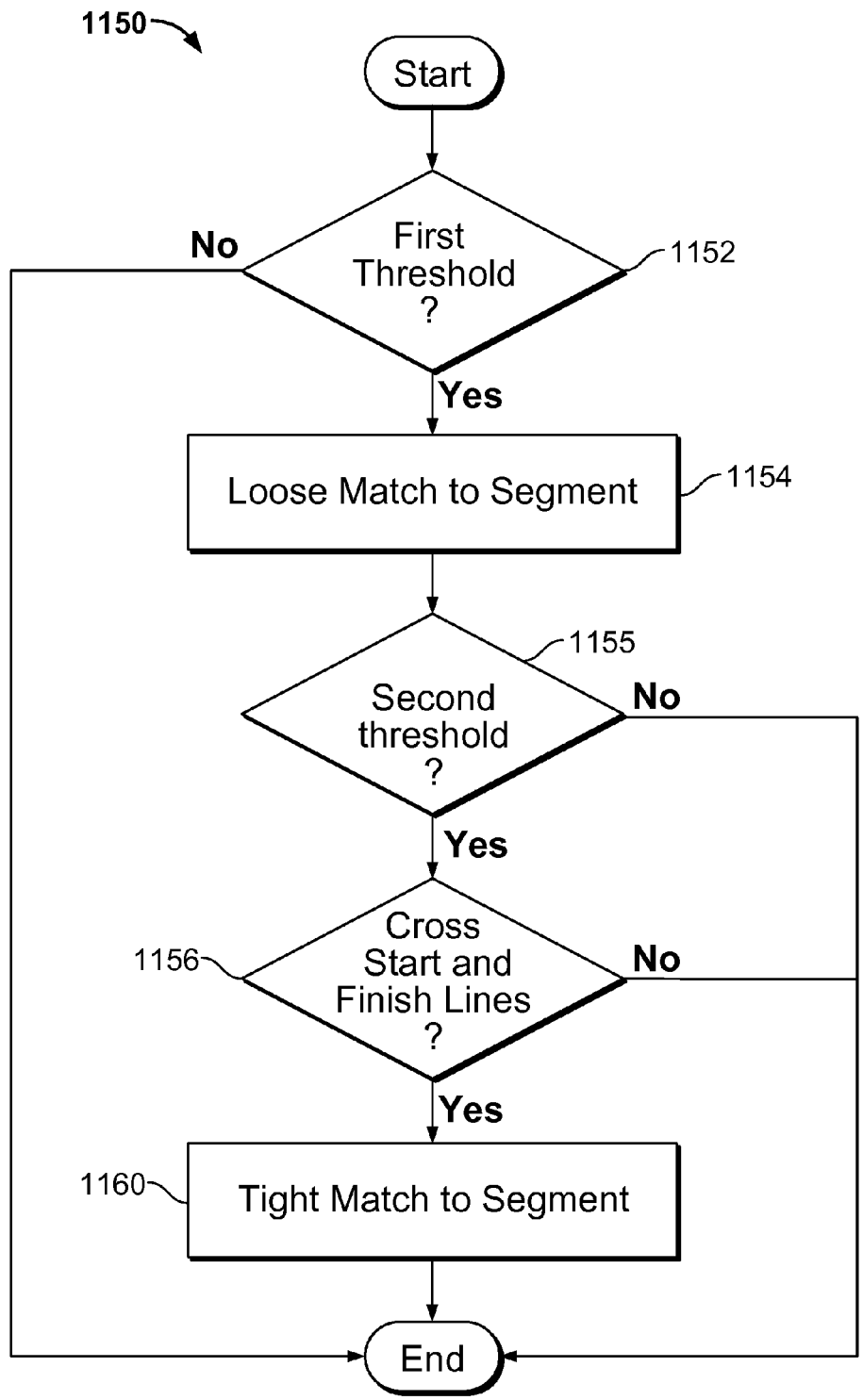
FIG. 11B is a flow diagram showing an embodiment of matching an effort to a segment.

FIG. 11B is a flow diagram showing an embodiment of matching an effort to a segment. In some embodiments, process 1150 is used to implement 1106 in accordance with some embodiments.

At the start of process 1150, assume that 1104 has been performed and the query has returned similar portions (e.g., overlapped MBRs or GPS data points that are within a given tolerance) for a segment.

In some embodiments, matching an effort to a segment includes 1152 and ends after 1154 (e.g., determination of a loose match), but not a determination of a tight match. In some embodiments, matching an effort to a segment includes 1155 to 1160 (e.g., determination of a tight match), but not a determination of a loose match. In some embodiments, matching an effort includes both the determination of a loose match and a tight match of an effort to a stored segment.

At 1152, it is determined whether the percentage of match between an effort and the segment exceeds a first threshold. If the percentage of match is below the first threshold (e.g., the percentage of match is below 65%), then the effort is deemed to not match the segment and process 1150 ends. If the percentage of match exceeds the first threshold (e.g., the percentage of match is above 65%), then the effort is deemed to be a loose match to the segment at 1154 and control passes to 1155.

At 1155, it is determined whether the percentage of match between an effort and the segment exceeds a second threshold. If the percentage of match exceeds the second threshold (e.g., the percentage of match is above 80%) then the effort is deemed be a candidate to be a tight match of the segment and control passes to 1156. If the percentage of match is below the second threshold (e.g., the percentage of match is between 65% to 79%), then the effort is deemed not to be a tight match (and only a loose match) and the process ends.

At 1156, it is determined whether the effort crosses the start and finish lines of the segment. If both the start and the finish lines are crossed, then the effort is deemed to be a tight match of the segment at 1160. However, if one or both of the lines are not crossed, then the process ends and the effort is deemed not to be a tight match (and only as a loose match).

Figure 12:
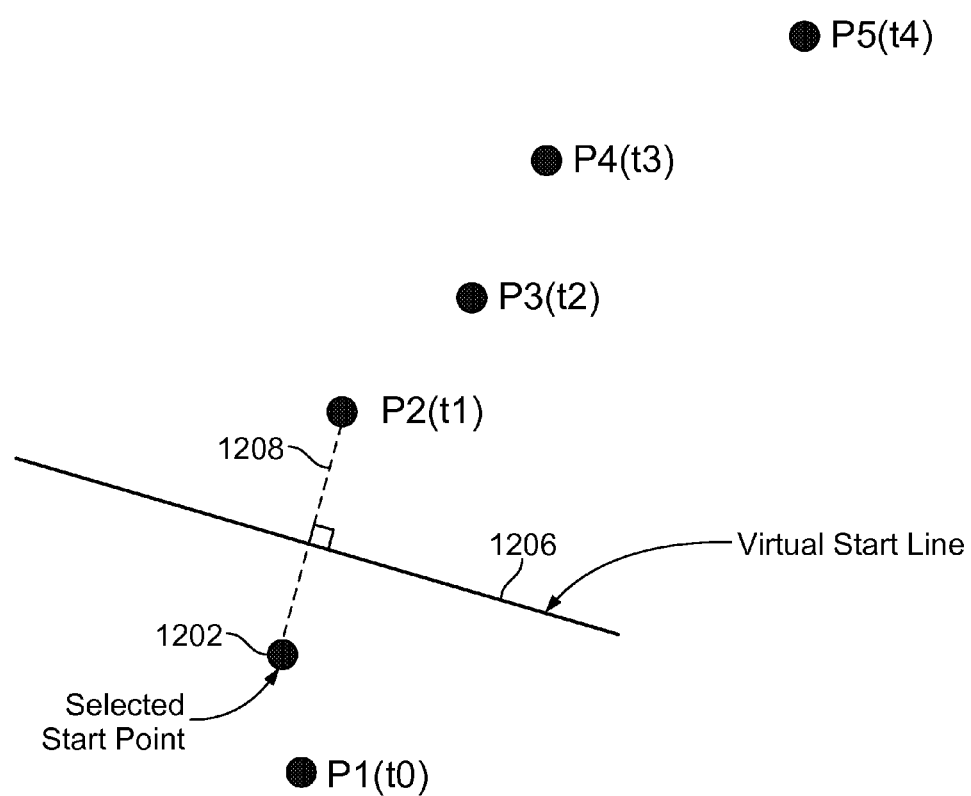
FIG. 12 is a diagram showing an example of creating a virtual start line in accordance with some embodiments.

FIG. 12 is a diagram showing an example of creating a virtual start line in accordance with some embodiments. In some embodiments, a virtual start line is a created for a defined segment. In some embodiments, when a segment is defined using a recorded effort (e.g., by process 400), the virtual start line is derived from the GPS information and the selected start point.

In the example of FIG. 12, the recorded effort is represented by the series of consecutive GPS coordinates P1(t0), P2(t1), P3(t2), P4(t3) and P5(t4). Point P1(t0) was passed earlier in time than P2(t1), and P2(t1) was passed earlier in time than P3(t2), and so forth. The start point is selected at location 1202. The selected start point takes place after P1(t0) was passed but before P2(t1) was also passed. Since the next GPS coordinate of the series is P2(t1) that is not passed, linear path 1208 is drawn from P2(t1) to the selected start point. Virtual start line 1206 is selected to be in a position such that its center crosses with the center of linear path 1208 between the selected start point and P2(t1). In the example, virtual start line 1206 crosses with linear path 1208 at a 90 degree angle, although the two can cross at a different angle as well. The length of virtual start line can be selected to any appropriate length (e.g., 100 meters). In some embodiments, the virtual start line can be stored at the segments database with its associated segment. In some embodiments, the virtual start line can be stored as only the coordinates of the two ends of the line (e.g., because the line can be recreated by drawing a straight line between the two coordinates). In some embodiments, the virtual start line can be stored as a close series of consecutive GPS coordinates along the line.

In some embodiments, a finish line can be created and stored in a similar manner as the previous technique.

In some embodiments, a start (or finish) line is considered to be crossed when the series of GPS information of an effort can be determined to intersect the line. For example, even though a series of GPS information is made of discrete points, if two consecutive points are found to be on different sides of the line, then the associated track is considered to have crossed the line. In some embodiments, if a point in a series is found to be close (e.g., within a given distance) from the line, then an extrapolation of the series of GPS information can be made based on the associated data (e.g., speed, grade, heart rate) that is known about the effort to determine whether if the actual physical activity had cross the virtual line, even if the corresponding recording did not indicate this. For example, some GPS-enabled devices records GPS information at different frequencies than others. As such, some discrepancies may occur between the recorded GPS information depending on the type of recording device used. However, by extrapolating GPS information based on other known data, at least some discrepancies may be compensated for to better ensure that an athlete who has actually crossed a line is given such credit.

Figure 13:
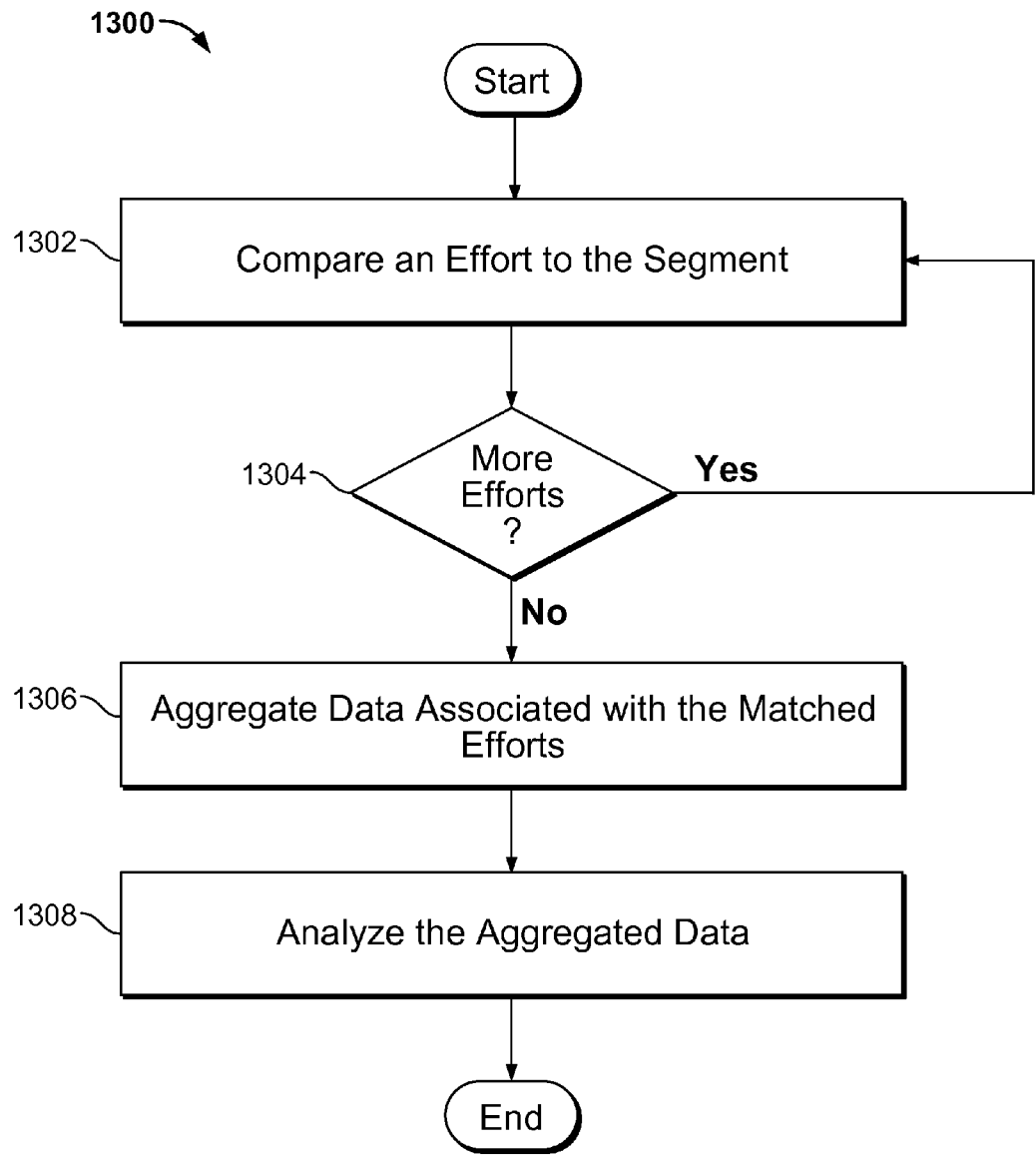
FIG. 13 is flow diagram showing an embodiment of a process of determining matching efforts in accordance with some embodiments.

FIG. 13 is flow diagram showing an embodiment of a process of determining matching efforts in accordance with some embodiments.

At 1302, an effort is compared to a segment. In some embodiments, the segment is already defined. In some embodiments, the segment is stored at a database. In some embodiments, the segment is stored as a set of MBRs. In some embodiments, the segment is stored as a series of GPS data points. In some embodiments, the effort is accessed from a database of stored past efforts.

In various embodiments, the effort is compared to a segment to determine to a percentage of match. In some embodiments, the GPS information associated with the effort is accessed (e.g., from a database). In some embodiments, if the segment is stored as a set of MBRs, then the GPS information of the effort is also converted into a set of MBRs and then compared. In some embodiments, if the segment is stored as a set of GPS information, then GPS information of the effort need not be converted.

In some embodiments, if the percentage of match is beyond a threshold, then the effort is deemed to match the segment. In some embodiments, an effort can match a segment at two different levels (e.g., loose match and tight match). If the effort matches a segment at the lower threshold, then it is determined that the effort is a loose match, which implies a lower degree of similarity between geographical tracks of the effort and the segment. If the effort matches a segment at the higher threshold, and additionally, it is determined the effort crosses both the start and finish lines of the segment, then it is determined that the effort is a tight match. In some embodiments, a tight match implies a high degree of similarity between the geographical tracks between (at least a portion) of the effort and the segment. In some embodiments, an identifier associated with the effort that matches a segment is stored with the segment. In some embodiments, an identifier for a segment that matches the effort is stored with the effort.

At 1304, it is determined whether there are more efforts to compare to the segment. In some embodiments, all the stored efforts are compared to the segment. In some embodiments, only a subset of the stored efforts is compared to the segment. In some embodiments, all the efforts compared to the segment is associated with one user. In some embodiments, the efforts that are compared to the segment are associated with more than one user.

At 1306, the data associated with the matched efforts are aggregated. In some embodiments, for the efforts that have been deemed to match the segment (e.g., as approximate matches and or close matches), their associated data (e.g., heart, speed, heart rate, power, time) are accessed (e.g., at the efforts database) and aggregated. For example, the aggregated data may be temporarily stored in another database.

At 1308, the aggregated data is analyzed. In some embodiments, calculations are performed using the aggregated data of the matched efforts. For example, the average heart rate, average speed, average time, average power, and/or average grade can be calculated. In some embodiments, the set of associated data for each effort is compared to the sets of associated data for each other effort to create a sorted list of matched efforts (e.g., the list can be sorted based on any one metric of the associated data). For example, a sorted list can include a descending list of efforts with the fastest time. Or, in another example, a sorted list can include an ascending list of efforts with the highest power. For example a sorted list can include a list of the most recently recorded efforts. In some embodiments, the analysis of the aggregated data can be displayed (e.g., at a user interface). The display can include tables and/or visuals.

FIG. 14 is a diagram showing an example of a display of analyzed data for matched efforts in accordance with some embodiments. In some embodiments, the example of FIG. 14 is displayed for a selected segment for which matching efforts have been determined. Put another way, each effort that has been matched to the segment implies that each effort has been deemed to have traversed the geographical track referenced by the segment. The example of FIG. 14 can be displayed at a user interface (e.g., at a device). In the example, the physical activity associated with the efforts is cycling so each effort is referred to as a ride. Section 1402 includes a list of the most recent rides including the users, times, heart rates, power and time. Section 1404 includes a list of rides sorted by time, where the fastest time to complete the segment is listed first. The list of section 1402 is an example of a "leader board."

By defining a geographical track as a segment, it can be easily referenced for comparisons of athletic performance over the track. In some embodiments, a user can define a segment at a user interface using recorded GPS data from his or her own physical activity. In some embodiments, a user can define a segment at a user interface by making selections on a map. However a segment is defined, once it has been defined, a stored history of athletic performance (e.g., efforts) can be accessed to match the segment. The associated data of the matching efforts can be aggregated and presented in a table or visual that represents all or a subset of all athletic performance associated with the segment. In some embodiments, the same user or another user can subsequently check if his or her recorded activity included or matched a defined segment. In this subsequent check, the user can benefit from the automatic match of his or her recorded activity against defined and stored segments, without needing to know exactly where a segment begins or ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving a user submitted definition of a first segment via a user interface input, wherein a recorded effort comprises the first segment and one or more of the following: heart rate, speed, time, and power, wherein the first segment comprises a portion of a set of Geographic Positioning System (GPS) data associated with the recorded effort, and wherein the first segment is defined based at least in part on a user selected segment start point and a user selected segment end point based on the set of GPS data associated with the recorded effort;
storing the first segment in a segments database;
determining that the first segment is redundant with respect to a second segment stored in the segments database, wherein the second segment comprises a portion of a set of GPS data associated with a different recorded effort, and wherein determining that the first segment is redundant with respect to the second segment comprises determining that the user submitted definition of the first segment at least partially overlaps with a user submitted definition of the second segment; and
in response to the determination that the first segment is redundant with respect to the second segment:
discarding the second segment from the segments database;
maintaining the first segment in the segments database associating a set of GPS data to a matching effort; and
determining the matching effort by matching a set of GPS data associated with the matching effort to the first segment, wherein determining the matching effort comprises matching the set of GPS data associated with the matching effort to the first segment using a first threshold of match for a loose match or a second threshold of match for a tight match, and wherein the tight match comprises determining that the matching effort crossed a start line and a finish line.

2. The method of claim 1, wherein data associated with the matching effort includes one or more of the following: heart rate, speed, time, and power.

3. The method of claim 1, further comprising accessing data associated with the matching effort.

4. The method of claim 1, further comprising storing data associated with the matching effort with the first segment.

5. The method of claim 1, wherein the definition of the first segment is based at least in part on selected points on a map application.

6. The method of claim 1, further comprising aggregating associated data of a plurality of matching efforts.

7. The method of claim 6, further comprising displaying at least a subset of the aggregated data in a table.

8. The method of claim 1, further comprising determining overlapping segments.

9. The method of claim 1, wherein the second threshold is higher than the first threshold.

10. The method of claim 1, wherein determining the matching effort includes performing a query at an R-Tree indexed database.

11. The method of claim 1, wherein at least one of the user selected segment start point and the user selected segment end point is selected based at least in part on a visual representation associated with the recorded effort.

12. The method of claim 1, wherein in response to the determination that the first segment is redundant with respect to the second segment, further comprising presenting a prompt at the user interface indicating that the first segment is redundant with respect to the second segment.

13. The method of claim 1, wherein discarding the second segment from the segments database is based at least in part on a user input received via the user interface.

14. The method of claim 1, wherein discarding the second segment from the segments database is based at least in part on crowdsourcing.

15. The method of claim 1, further comprising:
receiving the user selected segment start point based on the set of GPS data associated with the recorded effort;
determining that the user selected segment start point is associated with a plurality of times along the recorded effort or a plurality of distances along the recorded effort; and
receiving a selection of one of the plurality of times along the recorded effort or the plurality of distances along the recorded effort to be associated with the user selected segment start point.

16. A system, comprising:

a processor configured to:

receive a user submitted definition of a first segment via a user interface input, wherein a recorded effort comprises the first segment and one or more of the following: heart rate, speed, time, and power, wherein the first segment comprises a portion of a set of Geographic Positioning System (GPS) data associated with the recorded effort, and wherein the first segment is defined based at least in part on a user selected segment start point and a user selected segment end point based on the set of GPS data associated with the recorded effort;

store the first segment in a segments database;

determine that the first segment is redundant with respect to a second segment stored in the segments database, wherein the second segment comprises a portion of a set of GPS data associated with a different recorded effort, and wherein to determine that the first segment is redundant with respect to the second segment comprises to determine that the user submitted definition of the first segment at least partially overlaps with a user submitted definition of the second segment; and in response to the determination that the first segment is redundant with respect to the second segment:

discard the second segment from the segments database;

maintain the first segment in the segments database associating a set of GPS data to a matching effort; and determine the matching effort by matching a set of GPS data associated with the matching effort to the first segment, wherein determining the matching effort comprises matching the set of GPS data associated with the matching effort to the first segment using a first threshold of match for a loose match or a second threshold of match for a tight match, and wherein the tight match comprises determining that the matching effort crossed a start line and a finish line; and a memory coupled to the processor, wherein the memory is configured to provide the processor with instructions.

17. The system of claim 16, wherein data associated with the matching effort includes one or more of the following: heart rate, speed, time, and power.

18. The system of claim 16, wherein to determine the matching effort includes to perform a query at an R-Tree indexed database.

19. A computer program product, the computer program product being embodied in a non-transitory computer readable medium and comprising computer instructions for:

receiving a user submitted definition of a first segment via a user interface input, wherein a recorded effort comprises the first segment and one or more of the following: heart rate, speed, time, and power, wherein the first segment comprises a portion of a set of Geographic Positioning System (GPS) data associated with the recorded effort, and wherein the first segment is defined based at least in part on a user selected segment start point and a user selected segment end point based on the set of GPS data associated with the recorded effort;

storing the first segment in a segments database;

determining that the first segment is redundant with respect to a second segment stored in the segments database, wherein the second segment comprises a portion of a set of GPS data associated with a different recorded effort, and wherein determining that the first segment is redundant with respect to the second segment comprises determining that the user submitted definition of the first segment at least partially overlaps with a user submitted definition of the second segment; and in response to the determination that the first segment is redundant with respect to the second segment:

discarding the second segment from the segments database;

maintaining the first segment in the segments database associating a set of GPS data to a matching effort; and determining the matching effort by matching a set of GPS data associated with the matching effort to the first segment, wherein determining the matching effort comprises matching the set of GPS data associated with the matching effort to the first segment using a first threshold of match for a loose match or a second threshold of match for a tight match, and wherein the tight match comprises determining that the matching effort crossed a start line and a finish line.

* * * * *